US011107210B2

(12) United States Patent
Sakurai

(10) Patent No.: US 11,107,210 B2
(45) Date of Patent: Aug. 31, 2021

(54) IMAGE DATA GENERATING APPARATUS GENERATING IMAGE DATA FOR INSPECTING EXTERNAL APPEARANCE OF PRODUCT

(71) Applicant: Brother Kogyo Kabushiki Kaisha, Nagoya (JP)

(72) Inventor: Koichi Sakurai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/823,728

(22) Filed: Mar. 19, 2020

(65) Prior Publication Data
US 2020/0311895 A1    Oct. 1, 2020

(30) Foreign Application Priority Data

Mar. 25, 2019  (JP) .............................. JP2019-057270

(51) Int. Cl.
*G06T 7/00* (2017.01)
*G06T 5/00* (2006.01)
*G06T 5/50* (2006.01)

(52) U.S. Cl.
CPC .............. *G06T 7/001* (2013.01); *G06T 5/002* (2013.01); *G06T 5/009* (2013.01); *G06T 5/50* (2013.01); *G06T 2207/20081* (2013.01); *G06T 2207/20224* (2013.01)

(58) Field of Classification Search
CPC . G06T 2207/20084; G06T 2207/20081; G06T 5/40; G06T 7/0004; G06T 7/001; G06K 2209/19; G06K 9/40; G06K 9/6271; G06K 9/66
See application file for complete search history.

(56) References Cited

U.S. PATENT DOCUMENTS

| 10,255,681 | B2* | 4/2019 | Price .......................... G06T 7/90 |
| 10,599,951 | B2* | 3/2020 | Bhaskar ................. G06T 7/0004 |
| 2013/0148987 | A1* | 6/2013 | Arakawa ............... G06K 9/3216 |
| | | | 399/15 |
| 2017/0148153 | A1 | 5/2017 | Nakao |
| 2020/0089130 | A1* | 3/2020 | Chao ...................... G03F 7/7065 |
| 2021/0034961 | A1* | 2/2021 | Lovell ................. G05B 19/4207 |

FOREIGN PATENT DOCUMENTS

JP        2017-096749 A    6/2017

* cited by examiner

*Primary Examiner* — Li Liu
(74) *Attorney, Agent, or Firm* — Burr & Brown, PLLC

(57) ABSTRACT

In an image data generating apparatus, an image processor acquires target output image data converted from target input image data by a pre-trained model. The target input image data represents a captured image of a target product. The target output image data represents an image of a target product free from defects. The pre-trained model performs data compression and data decompression on inputted image data. The image processor generates first data by performing a first generation process on the target input image data. The first generation process includes a luminosity adjustment process adjusting luminosity in image data. The image processor generates second data by performing a second generation process including the luminosity adjustment process on the target output image data. The image processor generates inspection image data by using a difference between the first data and the second data for inspecting an external appearance of the target product.

18 Claims, 11 Drawing Sheets

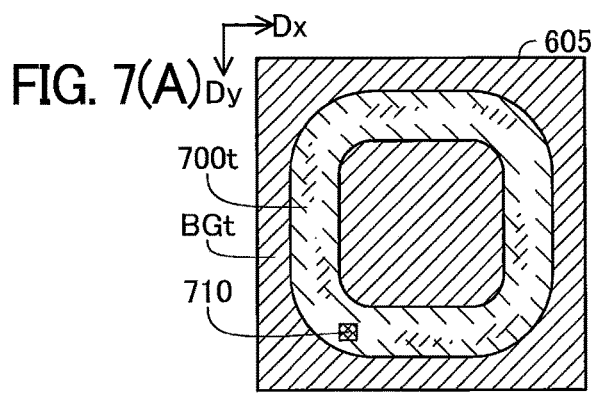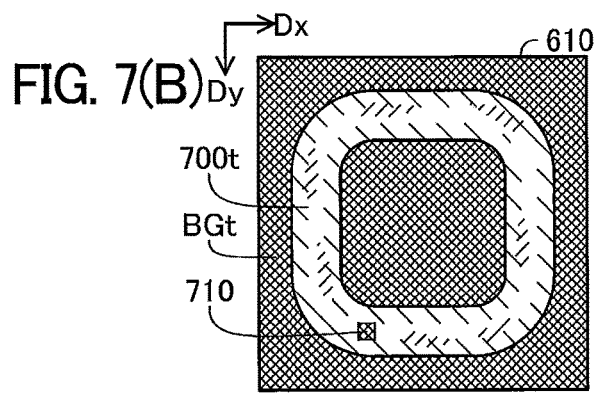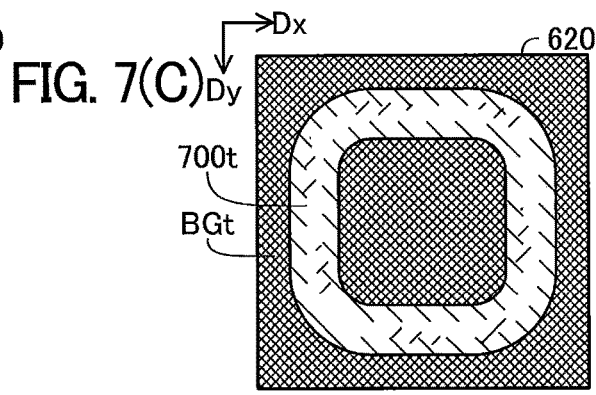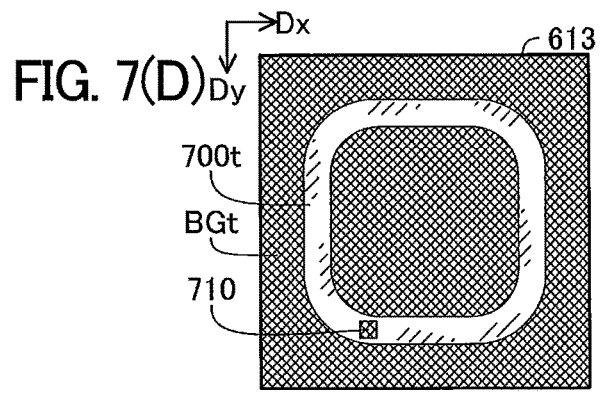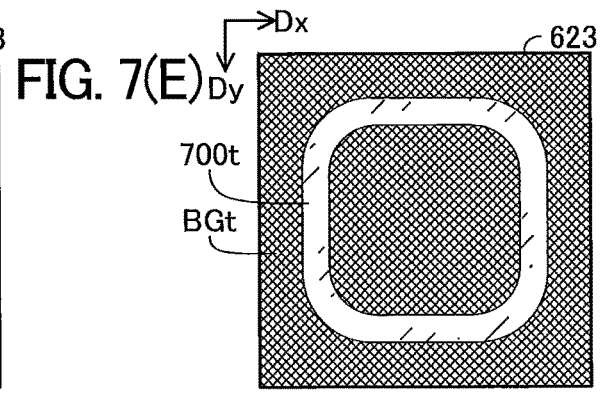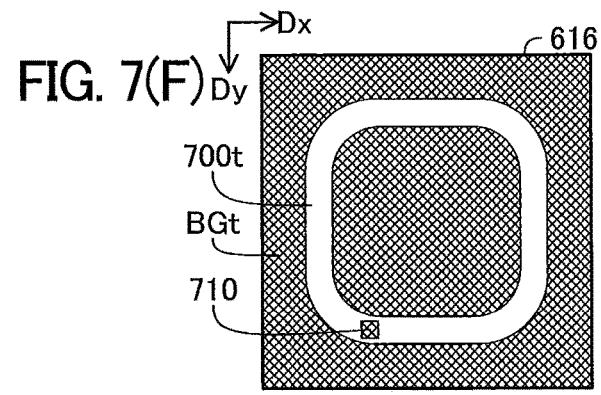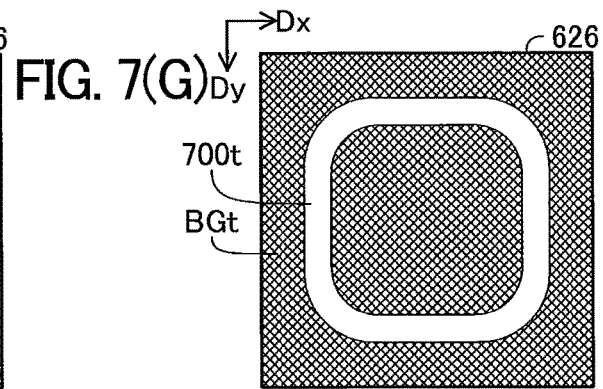

IMAGE DATA GENERATING APPARATUS GENERATING IMAGE DATA FOR INSPECTING EXTERNAL APPEARANCE OF PRODUCT

CROSS REFERENCE TO RELATED APPLICATION

This application claims priority from Japanese Patent Application No. 2019-057270 filed Mar. 25, 2019. The entire content of the priority application is incorporated herein by reference.

TECHNICAL FIELD

The present disclosure relates to a technique for inspecting products using image data.

BACKGROUND

The following technology has been proposed for inspecting the external appearance of objects using images. With this technology, an image of the object to be inspected is captured and the captured image is compared to a reference image (for example, an image taken of a conforming item), or a model image created from the reference image, to determine whether the object being inspected has any defects or the like.

SUMMARY

The conventional technology described above identifies the position and orientation of a standard pattern for an acceptable product within an inspection image, and sets correction amounts for the position and orientation of an inspection region according to the identified position and orientation. Due to various factors, the generated inspection image may not be suitable for inspection. The position of the inspection region may be impossible to correct accurately due to the conditions under which the image of the inspection target was captured (brightness conditions, such as ambient light and the camera's T-number, for example) deviating from reference conditions, or when a blemish or other defect is present in the inspection target in an area corresponding to a feature of the standard pattern, for example.

In view of the foregoing, it is an object of the present disclosure to provide a technology for generating image data suitable for inspections.

In order to attain the above and other objects, the disclosure provides an image data generating apparatus. The image data generating apparatus includes an image processor configured to perform: acquiring target output image data that is converted from target input image data by a pre-trained model, the target input image data representing a captured image of a target product, the target output image data representing an image of a target product free from defects, the pre-trained model being configured to perform data compression and data decompression on image data inputted to the pre-trained model, wherein the pre-trained model is trained so that when image data representing an input image of the target product is inputted to the pre-trained model, the pre-trained model outputs image data representing an image of the target product free from defects irrespective of whether the input image includes a defect or not; generating first data by performing a first generation process on the target input image data, the first generation process including a luminosity adjustment process, the luminosity adjustment process adjusting luminosity in image data inputted to the luminosity adjustment process; generating second data by performing a second generation process on the target output image data converted from the target input image data by the pre-trained model in the acquiring, the second generation process including the luminosity adjustment process; and generating inspection image data by using a difference between the first data and the second data, the inspection image data being used for inspecting an external appearance of the target product.

According to another aspect, the disclosure provides a non-transitory computer readable storage medium storing a set of program instructions installed on and executed by a computer included in an image generating apparatus. The set of first program instructions, when executed by the computer, causes the image generating apparatus to perform: acquiring target output image data that is converted from target input image data by a pre-trained model, the target input image data representing a captured image of a target product, the target output image data representing an image of a target product free from defects, the pre-trained model being configured to perform data compression and data decompression on image data inputted to the pre-trained model, wherein the pre-trained model is trained so that when image data representing an input image of the target product is inputted to the pre-trained model, the pre-trained model outputs image data representing an image of the target product free from defects irrespective of whether the input image includes a defect or not; generating first data by performing a first generation process on the target input image data, the first generation process including a luminosity adjustment process, the luminosity adjustment process adjusting luminosity in image data inputted to the luminosity adjustment process; generating second data by performing a second generation process on the target output image data converted from the target input image data by the pre-trained model in the acquiring, the second generation process including the luminosity adjustment process; and generating inspection image data by using a difference between the first data and the second data, the inspection image data being used for inspecting an external appearance of the target product.

According to still another aspect, the disclosure provides a method for controlling an image generating apparatus. The method includes: acquiring target output image data that is converted from target input image data by a pre-trained model, the target input image data representing a captured image of a target product, the target output image data representing an image of a target product free from defects, the pre-trained model being configured to perform data compression and data decompression on image data inputted to the pre-trained model, wherein the pre-trained model is trained so that when image data representing an input image of the target product is inputted to the pre-trained model, the pre-trained model outputs image data representing an image of the target product free from defects irrespective of whether the input image includes a defect or not; generating first data by performing a first generation process on the target input image data, the first generation process including a luminosity adjustment process, the luminosity adjustment process adjusting luminosity in image data inputted to the luminosity adjustment process; generating second data by performing a second generation process on the target output image data converted from the target input image data by the pre-trained model in the acquiring, the second generation process including the luminosity adjustment process; and generating inspection image data by using a difference between the first data and the second data, the inspection image data being used for inspecting an external appearance of the target product.

BRIEF DESCRIPTION OF THE DRAWINGS

The particular features and advantages of the disclosure as well as other objects will become apparent from the following description taken in connection with the accompanying drawings, in which:

FIG. 7(A) is an explanatory diagram showing a target captured image;

FIG. 7(B) is an explanatory diagram showing a target input image;

FIG. 7(C) is an explanatory diagram showing a target output image;

FIG. 7(D) is an explanatory diagram showing an adjusted image;

FIG. 7(E) is an explanatory diagram showing a binarized image;

FIG. 7(F) is an explanatory diagram showing an adjusted image;

FIG. 7(G) is an explanatory diagram showing a binarized image;

DETAILED DESCRIPTION

A. First Embodiment

A1. Structure of a Data Processing Apparatus

Figure 1:
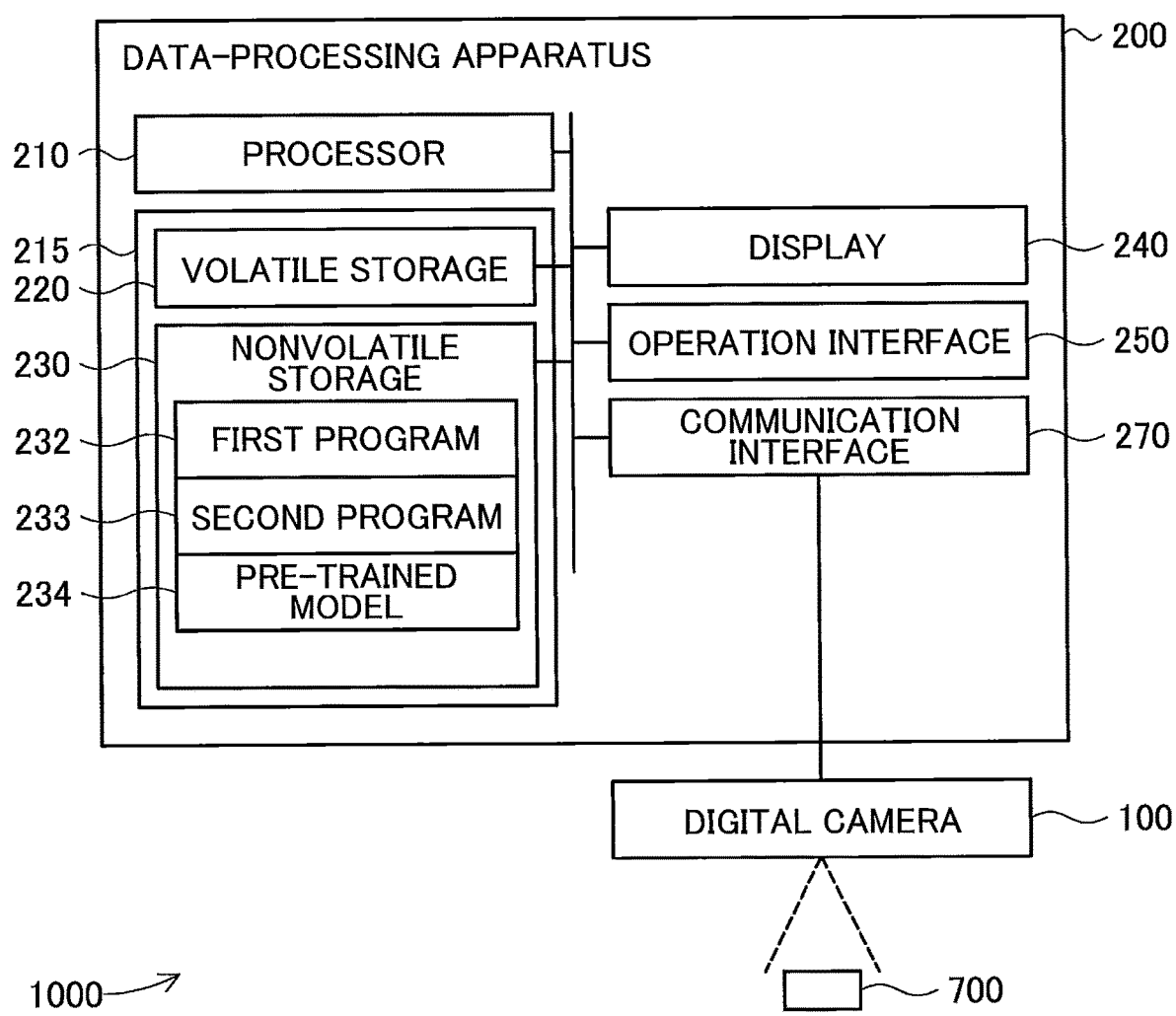
FIG. 1 is a block diagram illustrating an inspection system according to a first embodiment.

FIG. 1 is a block diagram showing an inspection system 1000 according to the embodiment. The inspection system 1000 can inspect the external appearance of a product 700. The product 700 may be any product that has been determined in advance. For example, the product 700 may be a part for a device such as a multifunction peripheral, a scanner, a digital camera, or a printer.

The inspection system 1000 is provided with a data-processing apparatus 200, and a digital camera 100 connected to the data-processing apparatus 200. The data-processing apparatus 200 is a personal computer, for example. The data-processing apparatus 200 has a processor 210, a storage 215, a display 240 that displays images, an operation interface 250 that receives user operations, and a communication interface 270. These components are interconnected via a bus. The storage 215 further includes a volatile storage 220, and a nonvolatile storage 230.

The processor 210 is a device, such as a CPU, that performs data processing. The volatile storage 220 is configured of DRAM, for example. The nonvolatile storage 230 is configured of flash memory, for example.

The nonvolatile storage 230 stores a first program 232 for training a neural network, a second program 233 for inspecting a product, and a pre-trained model 234. The pre-trained model 234 is a prediction model that has been trained to output image data representing an image of a product 700 free from defects, even when the image data inputted into the pre-trained model 234 represents an image of a product 700 having defects, by compressing and decompressing the inputted image data. In the embodiment, the pre-trained model 234 is a model of an artificial neural network called an autoencoder (described later in greater detail). The pre-trained model 234 is a program module in the embodiment.

Various intermediate data that the processor 210 uses for executing the first program 232, the second program 233, and the pre-trained model 234 is temporarily stored in the storage 215 (one of the volatile storage 220 or nonvolatile storage 230, for example).

The display 240 is a liquid crystal display, an organic EL display, or the like that serves to display images. The operation interface 250 is a device that accepts user operations, such as a touchscreen arranged over the display 240, buttons, levers, and the like. By operating the operation interface 250, the user can input various instructions into the data-processing apparatus 200. The communication interface 270 is an interface for communicating with other devices. For example, the communication interface 270 may be a USB interface, a wired LAN interface, or a wireless communication interface conforming to the IEEE 802.11 standard. The digital camera 100 is connected to the communication interface 270.

Figure 2:
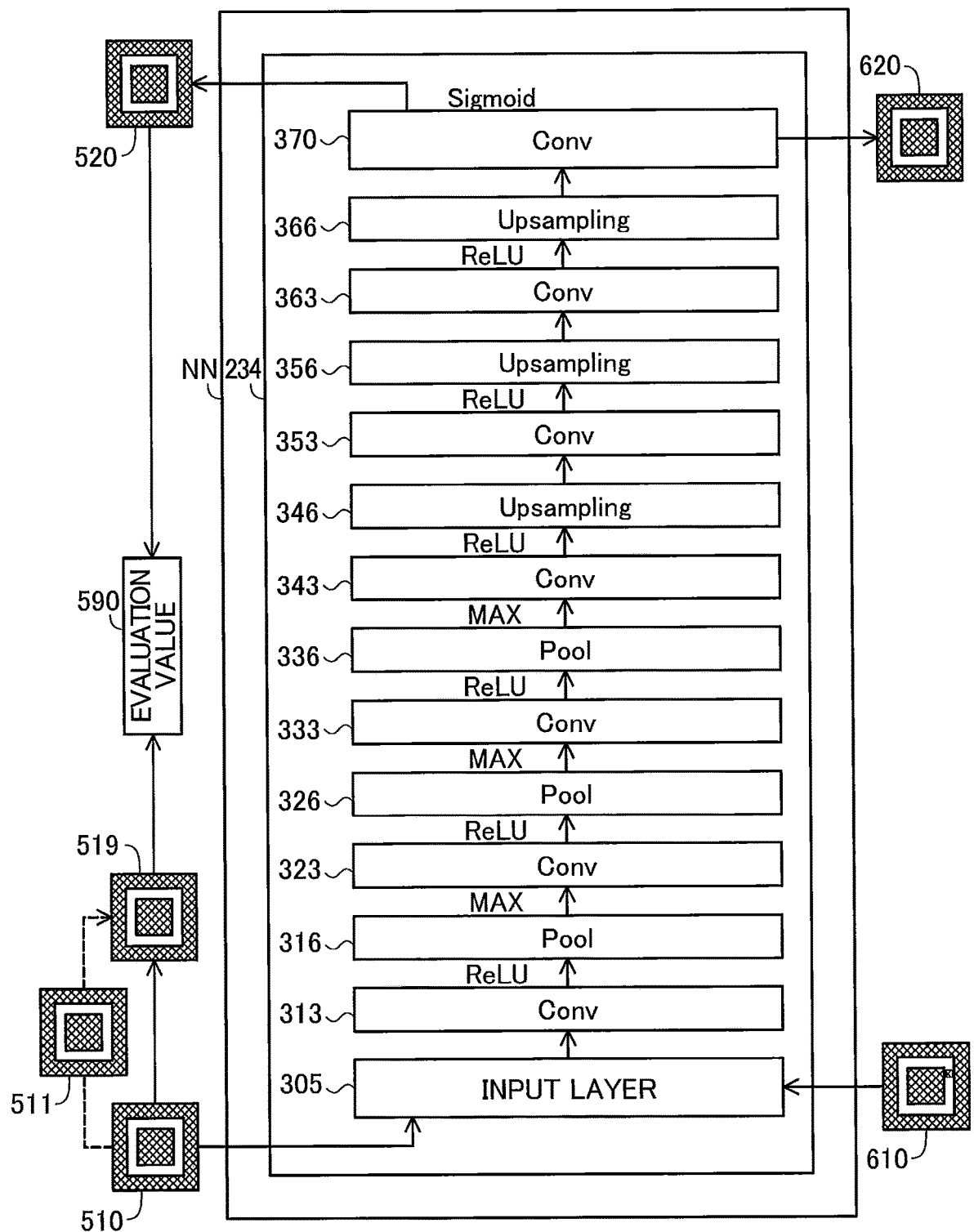
FIG. 2 is a block diagram illustrating an artificial neural network.

FIG. 2 is an explanatory diagram showing an example of an artificial neural network NN (hereinafter simply called the "neural network NN"). The neural network NN is used for generating the pre-trained model 234 (see FIG. 1). In the embodiment, the neural network NN is known as an autoencoder (hereinafter, the neural network NN will also be called the "autoencoder NN"). An autoencoder outputs data that is approximately equivalent to inputted data by compressing and decompressing the inputted data. Through compression, the autoencoder extracts features from the data and, through decompression, outputs data indicating these features. The autoencoder NN will be described later in detail.

A2. Training the Neural Network NN

Figure 3:
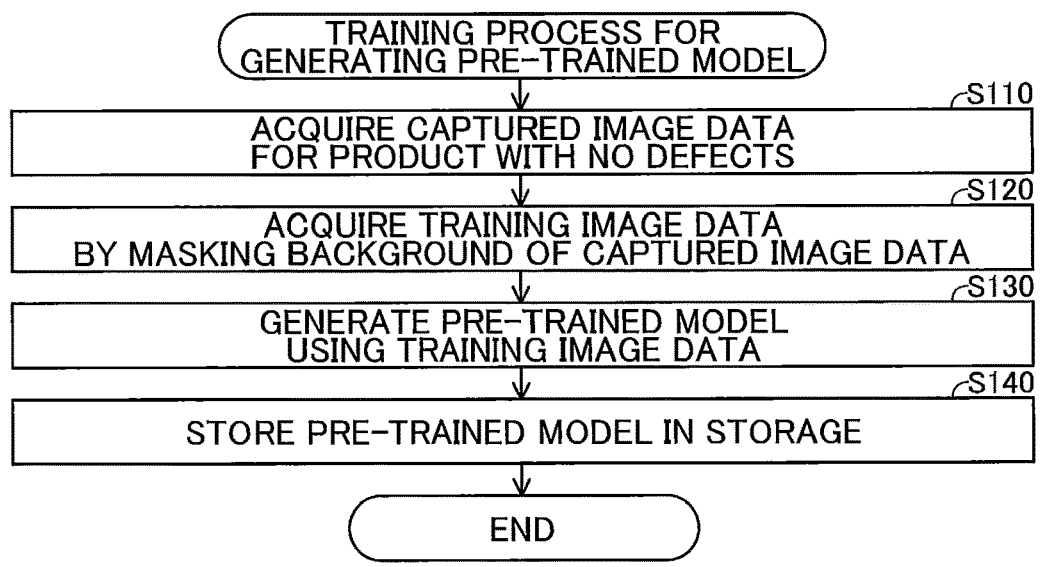
FIG. 3 is a flowchart illustrating a process for training.

FIG. 3 is a flowchart illustrating steps in a process for training the neural network NN. In the following description, the processor 210 of the data-processing apparatus 200 (see FIG. 1) begins the process in FIG. 3 in response to an instruction from an operator conducting the training. The processor 210 executes the process in FIG. 3 according to the first program 232 for training.

In S110 the processor 210 acquires captured image data for the product 700. In the embodiment, the product 700 is placed before the digital camera 100, with a predetermined surface of the product 700 facing the digital camera 100. The product 700 is illuminated with a light source (not shown). The light source is configured so that the brightness of the product 700 is substantially uniform in the captured image. For example, a plurality of light sources may be arranged around the periphery of the product 700. In this state, the processor 210 supplies a command to the digital camera 100 to capture the image. In response to the command, the digital camera 100 captures an image of the product 700 and generates captured image data representing the captured image of the product 700. The captured image data in the embodiment is RGB bitmap data. The processor 210 acquires the captured image data from the digital camera 100.

Figure 4:
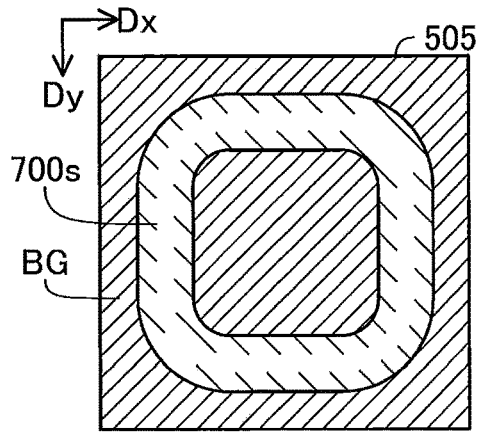
FIG. 4(A) is an explanatory diagram showing a captured image.
FIG. 4(B) is an explanatory diagram showing a training image.
FIG. 4(C) is an explanatory diagram showing an output image.
Figure 4:
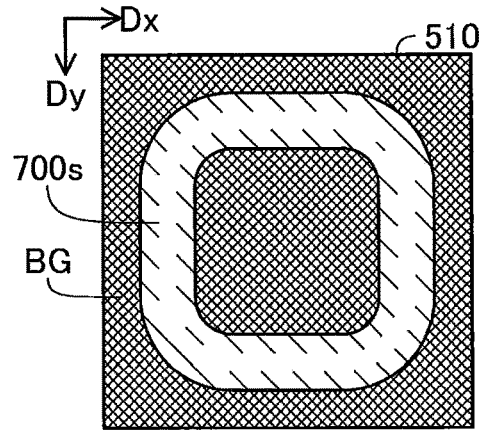
Figure 4:
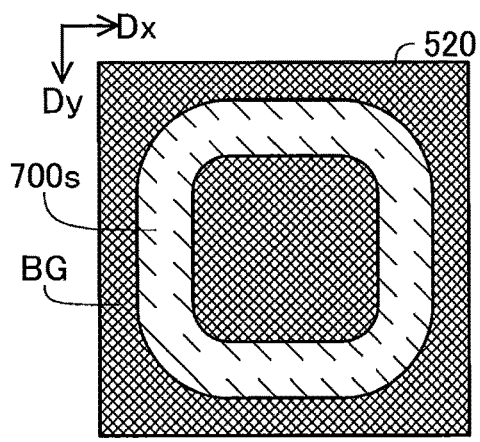

FIG. 4(A) is an explanatory diagram showing a sample captured image 505. The captured image 505 represents a product 700s, and a background BG. Captured image data for this captured image represents color values for each of a plurality of pixels arranged in a matrix configuration having a first direction Dx, and a second direction Dy perpendicular to the first direction Dx. In S110 of FIG. 3, a product 700s with no blemishes or other defects is captured, and thus the captured image data has no defects. In the following description, a product with no defects will also be called a "conforming product 700s." In the embodiment, the product 700s is a substantially square annular member. In addition, the background BG is darker than the product 700s. When the product has a light color, the product 700s is rendered in the captured image 505 using a lighter color than the background BG, for example.

In S120 of FIG. 3, the processor 210 acquires training image data for a training image using the captured image data. FIG. 4(B) is an explanatory diagram showing a sample training image 510. The training image 510 is an image acquired from the captured image 505 in FIG. 4(A). Training image data in the embodiment is grayscale bitmap data having a predetermined target image size. The target image size is the size of image data that the autoencoder NN can receive as input. For example, the target image size may be 208×208 pixels. Further, the gray is expressed in 256 shades (also called luminosity values) from 0 to 255, for example. Correlations between the color values of the captured image data and the luminosity values are predetermined. For example, the luma Y calculated according to well-known correlations between RGB color values and YCbCr color values may be used as the luminosity values in the training image data.

In the embodiment, the relative arrangement of the digital camera 100 and the product 700s is predetermined so that the entire product 700s is included in a predetermined portion of the captured image having the target size. Hence, the processor 210 acquires training image data by extracting the predetermined portion of the captured image. The processor 210 acquires the training image data by also masking the background BG. In the embodiment, the processor 210 sets the luminosity value for pixels in the background BG to the luminosity value of the darkest black (0 in this case). Any of various methods may be used to identify the background BG. In the embodiment, the processor 210 identifies pixels in the background BG by analyzing the captured image or the training image. For example, the processor 210 identifies the portion representing the product 700s in the captured image through pattern matching using a predetermined image of the product. In this way, the processor 210 identifies the portion remaining after excluding the identified portion as the background BG. Alternatively, the plurality of pixels having a luminosity value less than or equal to a predetermined threshold may be set as pixels in the background BG.

Note that the processor 210 may identify the product 700s in the captured image by analyzing the captured image data and may acquire the training image data by extracting the portion of the captured image data that includes the identified product 700s. Alternatively, the processor 210 may acquire the training image data by executing an image process that includes a process to convert the resolution (i.e., the pixel density).

Through S110 and S120 the processor 210 generates a plurality of sets of training image data. For example, the processor 210 may generate a plurality of sets of training image data by capturing a plurality of images for the product 700s. Alternatively, the plurality of sets of training image data may be generated by rotating the captured image. Alternatively, a plurality of sets of training image data may be generated by adjusting the luminosity values in the captured image. As will be described later, when training the autoencoder NN, training image data is inputted into the autoencoder NN, and the output image data outputted from the autoencoder NN in response is compared to supervised image data (i.e., image data of the product 700s). In the embodiment, the supervised image data is identical to the training image data inputted into the autoencoder NN (hereinafter called "input training image data"). However, the supervised image data may differ from the input training image data. For example, the processor 210 may generate supervised image data by adjusting the luminosity of the input training image data. Specifically, the supervised image data may be acquired by reducing luminosity values in the input training image data or may be acquired by increasing luminosity values in the input training image data.

Thus, through S110 and S120 of FIG. 3, the processor 210 generates a plurality of combinations of input training image data and supervised image data. In the following description, the combinations of input training image data and supervised image data will be called training datasets. As described above, the supervised image data may be the same as the input training image data or different from the input training image data. In either case, the size, arrangement, and shape of the product in the image rendered by the supervised image data are preferably all the same as the size, arrangement, and shape of the product in the image represented by the input training image data.

In S130 of FIG. 3, the processor 210 trains the autoencoder NN (see FIG. 2) using the plurality of training datasets. In the embodiment, the autoencoder NN is configured of a plurality of layers 305-370 including convolutional layers.

As shown in FIG. 2, the autoencoder NN specifically has an input layer 305, a first convolutional layer 313, a first pooling layer 316, a second convolutional layer 323, a second pooling layer 326, a third convolutional layer 333, a third pooling layer 336, a fourth convolutional layer 343, a first upsampling layer 346, a fifth convolutional layer 353, a second upsampling layer 356, a sixth convolutional layer 363, a third upsampling layer 366, and a seventh convolutional layer 370. These layers 305-370 are connected in the order given. In the embodiment, the autoencoder NN is a program module that is included in the first program 232. The processor 210 implements the functions of each of the layers 305-370 by executing the process according to the program module (the autoencoder NN). Next, these layers 305-370 will be described in sequence.

The input layer 305 acquires data from outside the autoencoder NN. In the embodiment, input training image data for the product 700s is inputted into the input layer 305. The image data inputted into the input layer 305 is used as input information by the first convolutional layer 313.

The first convolutional layer 313 performs a convolution process on the inputted image. In a convolution process, values specifying correlations (hereinafter called "feature values") between the inputted image (hereinafter called the "input image") and the filter are calculated while sliding the filter over the input image. The filter used in the convolution process is called a weighted filter. The size of a single weighted filter is P×P pixels, for example (where P is an integer of 2 or greater, such as 5). The stride (i.e., the number of steps (or a sliding amount) the filter is moved each time) is 1, for example. The filter slides over the entire input image in order to calculate feature values at all pixel positions in the input image. In this case, pixels are supplemented by adding zero padding around the outside of the input image. Alternatively, the filter may be slid so as to calculate feature values at all pixel positions excluding the edge portions of the input image. In this way, the filter generates bitmap data (called a "feature map") for an image having the same size as the input image (or an image smaller than the input image). Specifically, a list of color values is acquired for the P×P pixels in the portion of the inputted image data corresponding to the filter position. A dot product is calculated from the acquired list and a list of the P×P weights in the filter. A value obtained by adding this dot product to a bias is inputted into an activation function. The calculation result of the activation function is used as the value for one element in the feature map. In the embodiment, a rectified linear unit (ReLU) is used as the activation function. Q weighted filters are used in the embodiment (where Q is an integer of 1 or greater). Hence, when functioning as the first convolutional layer 313, the processor 210 generates Q feature maps. Note that a bias is also prepared for each filter. The elements in each of the Q filters and the Q biases are updated through training.

The feature maps outputted from the first convolutional layer 313 are used as input information by the first pooling layer 316. Pooling is a process for reducing the size of the image (the feature map in this case). The first pooling layer 316 performs what is called max pooling. Max pooling is a process for reducing a feature map through downsampling. In this process, the map is reduced by sliding a window over the map while selecting the maximum value of the elements in the window. In the embodiment, the size of the window used by the first pooling layer 316 is T×T pixels, and the stride is T (where T is an integer of 2 or greater, such as 2). This process generates a map having a height 1/T and a width 1/T of the original map. When functioning as the first pooling layer 316, the processor 210 generates Q reduced feature maps from the Q feature maps.

The feature maps outputted from the first pooling layer 316 are used as input information by the second convolutional layer 323. The second convolutional layer 323 performs a convolution process on the image according to a procedure similar to the process performed by the first convolutional layer 313. A plurality of filters is used in the second convolution layer 323, for example. Each filter is provided with Q matrices corresponding to the Q feature maps. A single filter generates one feature map from Q feature maps. A ReLU is used as the activation function. Note that the size of one matrix in one filter (i.e., the number of pixels in the first direction Dx and the number of pixels in the second direction Dy) and the total number of filters may be a variety of values. Further, zero padding may be provided around the feature maps or may be omitted. The stride may be any of various values. The elements in each filter and the bias for each filter are updated through training.

The feature maps outputted by the second convolutional layer 323 are used as input information by the second pooling layer 326. The second pooling layer 326 performs max pooling according to the similar procedure used in the process performed by the first pooling layer 316. Through this process, the second pooling layer 326 generates reduced feature maps. The size of the window and the stride may be any of a variety of values.

The feature maps outputted by the second pooling layer 326 are used as input information by the third convolutional layer 333. The third convolutional layer 333 performs a convolution process on the image according to the similar procedure used in processes performed by the convolutional layers 313 and 323, and a ReLU is used as the activation function. The third convolutional layer 333 may have any of various configurations, where a configuration includes the size of one matrix in one filter (i.e., the number of elements in the first direction Dx and the number of elements in the second direction Dy), the total number of filters, the necessity for zero padding around the feature map, and the stride. The elements in each filter and the bias for each filter are updated through training.

The feature maps outputted from the third convolutional layer 333 are used as input information by the third pooling layer 336. The third pooling layer 336 performs max pooling according to the similar procedure used in the processes performed by the pooling layers 316 and 326. Through this process, the third pooling layer 336 generates reduced feature maps. The size of the window and the stride may be any of various values.

In the above processes, features of the image are acquired by the convolutional layers 313, 323, and 333, and the image is compressed by the pooling layers 316, 326, and 336.

The feature maps outputted from the third pooling layer 336 are used as input information by the fourth convolutional layer 343. The fourth convolutional layer 343 performs a convolution process on the image according to the similar procedure used in the processes performed by the convolutional layers 313, 323, and 333. A ReLU is used as the activation function. Note that the configuration of the fourth convolutional layer 343 may be any of various configurations, as with the other convolutional layers described above. The elements in each filter and the bias for each filter are updated through training.

The feature maps outputted from the fourth convolutional layer 343 are used as input information by the first upsampling layer 346. Upsampling is a process for enlarging the image (the feature map in this case). Any of various procedures may be used for upsampling. In the embodiment, the upsampling layers 346, 356, and 366 execute an unpooling process. The pooling layers 336, 326, and 316 correspond to the upsampling layers 346, 356, and 366, respectively. The upsampling layers 346, 356, and 366 use windows of the same size used in the corresponding pooling layers 336, 326, and 316. For example, the first upsampling layer 346 performs an unpooling process using a window having the same size as the window in the corresponding third pooling layer 336. In the unpooling process, one pixel in the feature map prior to enlargement is expanded to a plurality of pixels corresponding to the window, thereby enlarging the feature map. For example, when the window size is 2×2 pixels, a single pixel is expanded to 2×2 pixels through upsampling.

The feature maps outputted from the first upsampling layer 346 are used as input information by the fifth convolutional layer 353. The fifth convolutional layer 353 performs a convolution process on the image according to the similar procedure used in the processes of the other convolutional layers 313, 323, 333, and 343. A ReLU is used as the activation function. As with the other convolutional layers described above, the fifth convolutional layer 353 may have any of various configurations. The elements in each filter and each bias are updated through training.

The feature maps outputted from the fifth convolutional layer 353 are used as input information by the second upsampling layer 356. The second upsampling layer 356 performs an unpooling process using the window of the corresponding second pooling layer 326.

The feature maps outputted from the second upsampling layer 356 are used as input information by the sixth convolutional layer 363. The sixth convolutional layer 363 performs a convolution process on the image according to the similar procedure used in the processes performed by the other convolutional layers 313, 323, 333, 343, and 353. A ReLU is used as the activation function. As with the other convolutional layers described above, the sixth convolutional layer 363 may have any of various configurations. The elements in each filter and each bias are updated through training.

The feature maps outputted from the sixth convolutional layer 363 are used as input information by the third upsampling layer 366. The third upsampling layer 366 performs an unpooling process using the window of the corresponding first pooling layer 316.

The feature maps outputted from the third upsampling layer 366 are used as input information by the seventh convolutional layer 370. The seventh convolutional layer 370 performs a convolution process on the image according to the similar procedure used in the processes performed by the other convolutional layers 313, 323, 333, 343, 353, and 363 described above. A sigmoid function is used as the activation function. As with the other convolutional layers described above the seventh convolutional layer 370 may have any of various configurations. The elements in each filter and each bias is updated through training.

Through the above processes, features are extracted from the image by the convolutional layers 343, 353, 363, and 370, and the image is enlarged by the upsampling layers 346, 356, and 366. Note that these layers 343-370 are configured to output grayscale bitmap data from the seventh convolutional layer 370 at the target size. The layers 343-370 use data compressed by the layers 313-336 to generate image data representing an image having the same target size as the image prior to compression. Thus, the processes performed by layers 313-336 correspond to data compression, while the processes performed by layers 343-370 correspond to data decompression. The seventh convolutional layer 370 corresponds to the output layer in the neural network NN. The layers 313-366 between the input layer 305 and the output layer (the seventh convolutional layer 370 in this case) are called "hidden layers."

In S130 of FIG. 3, the autoencoder NN is trained using the plurality of training datasets described above. Specifically, the processor 210 inputs training image data into the input layer 305. The processor 210 executes the calculations in the layers 305-370 of the autoencoder NN and acquires output image data from the seventh convolutional layer 370. By comparing the output image data to the supervised image data, the processor 210 calculates an evaluation value 590. The evaluation value 590 indicates error, and specifically the discrepancy between the output image data and the supervised image data. Hence, the evaluation value 590 denotes the difference between an output image 520 represented by the output image data outputted from the autoencoder NN, and a supervised image 519 represented by the supervised image data. Using the evaluation value 590, the processor 210 updates the various parameters described above for the autoencoder NN (filters, biases, etc.) in order to reduce the error. Various methods may be utilized as the training method. For example, error backpropagation may be utilized. Further, the loss function used in the error backpropagation may be any of various functions. For example, a cross entropy or a contrastive loss function may be used. The evaluation value 590 may be calculated according to this loss function.

In this way, the autoencoder NN is trained so that the difference between the output image 520 and the supervised image 519 is decreased. As described above, the supervised image data is identical to the input training image data or is data obtained by adjusting luminosity in the input training image data (luminosity-adjusted image data). Accordingly, the supervised image 519 is equivalent to one of the training image 510 represented by the input training image data, or a luminosity-adjusted image 511 represented by the luminosity-adjusted image data. These images 510 and 511 (FIG. 2) are images of the conforming product 700s (see FIG. 4(B)). Through the above process, the autoencoder NN is trained such that the output image becomes an image equivalent to the inputted image of the conforming product 700s, only with no defects. The autoencoder NN is also trained such that the shape and position of a conforming product in the image are the same in both the input image and the output image. FIG. 4(C) is an explanatory diagram showing a sample output image 520. The trained autoencoder NN outputs the output image 520, which is similar to the training image 510 of the conforming product 700s.

In S140 of FIG. 3, the processor 210 stores the portion of the trained autoencoder NN from the input layer 305 to the seventh convolutional layer 370 in the storage 215 as the pre-trained model 234. The pre-trained model 234 is configured to execute processes using the parameters determined through the above training process. In the embodiment, the processor 210 stores the pre-trained model 234 in the nonvolatile storage 230, after which the processor 210 ends the process in FIG. 3.

A3. Inspection Process

Figure 5:
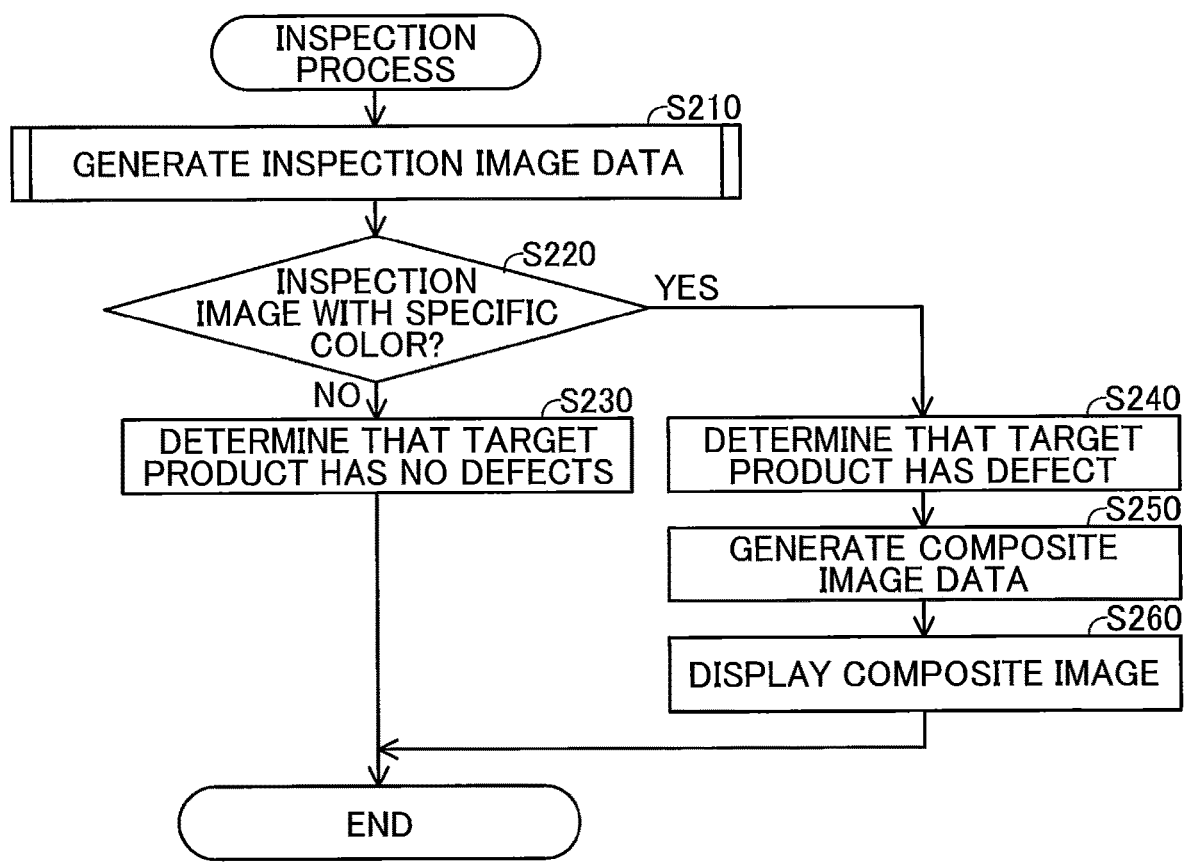
FIG. 5 is a flowchart illustrating an inspection process.

FIG. 5 is a flowchart illustrating steps in an inspection process. This inspection process may be executed on products 700 in a production line for devices that use the products 700, for example. The external appearance of the product 700 is inspected in this process. In the following description, the data-processing apparatus 200 shown in FIG. 1 executes the inspection process. Specifically, the processor 210 executes the process in FIG. 5 according to the second program 233 for the inspection process.

Figure 6:
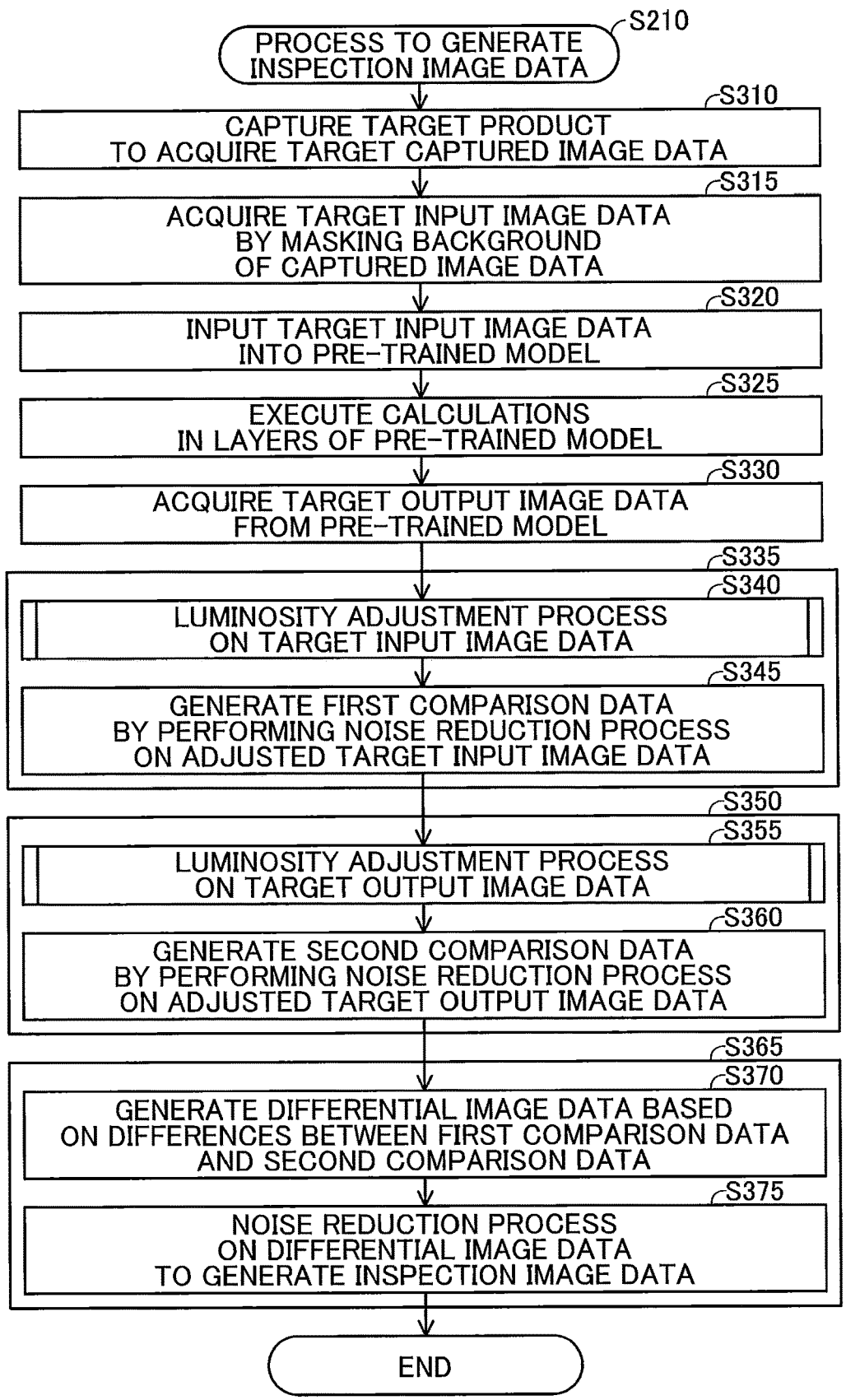
FIG. 6 is a flowchart illustrating a process for generating inspection image data.

In S210 the processor 210 generates inspection image data, i.e., image data that will be used for inspection. FIG. 6 is a flowchart illustrating steps in the process for generating inspection image data. In S310 the processor 210 acquires target captured image data, which is image data captured for a product targeted for inspection. The method of acquiring the captured image data is similar to that described in S110 of FIG. 3.

FIG. 7(A) is an explanatory diagram showing a sample target captured image 605 represented by target captured image data. As with the captured image 505 in FIG. 4(A), this target captured image 605 represents a target product 700*t*, and a background BGt. Unlike the conforming product 700*s* in FIG. 4(A), the target product 700*t* may have blemishes or other defects. The target product 700*t* in FIG. 7(A) has a defect 710. The defect 710 is rendered in a darker color than the other portions of the target product 700*t*.

In S315 of FIG. 6, the processor 210 acquires target input image data using the target captured image data. The target input image data is image data to be inputted into the pre-trained model 234, and specifically is grayscale bitmap data of the target size. The process of S315 is similar to the process of S120 in FIG. 3.

FIG. 7(B) is an explanatory diagram showing a sample target input image 610 represented by the target input image data. The target input image 610 is an example of an image acquired from the target captured image 605 in FIG. 7(A). As with the target captured image 605, the target input image 610 is an image of the target product 700*t*. The target input image 610 also renders the defect 710 of the target product 700*t*. The background BGt is rendered as black in the target input image 610.

In S320 of FIG. 6, the processor 210 inputs the target input image data into the pre-trained model 234. In S325 the processor 210 executes the calculations in layers 305-370 of the pre-trained model 234. In S330 the processor 210 acquires target output image data from the seventh convolutional layer 370.

FIG. 7(C) is an explanatory diagram showing a sample target output image 620 represented by the target output image data. The target output image 620 is an example of an image outputted by the autoencoder NN when using the target input image 610 of FIG. 7(B). The target output image 620 renders the target product 700*t* in the same shape and at the same position in the image as the target product 700*t* in the target input image 610. However, the defect 710 is not rendered in the target output image 620, because the autoencoder NN has been trained to output an image similar to the inputted image of the product, but without any defects, as described with reference to FIGS. 3, and 4(A)-4(C).

In S335 of FIG. 6, the processor 210 generates first comparison data using the target input image data. In the embodiment, step S335 includes steps S340 and S345. In S340 the processor 210 performs a luminosity adjustment process on the target input image data.

Figure 8:
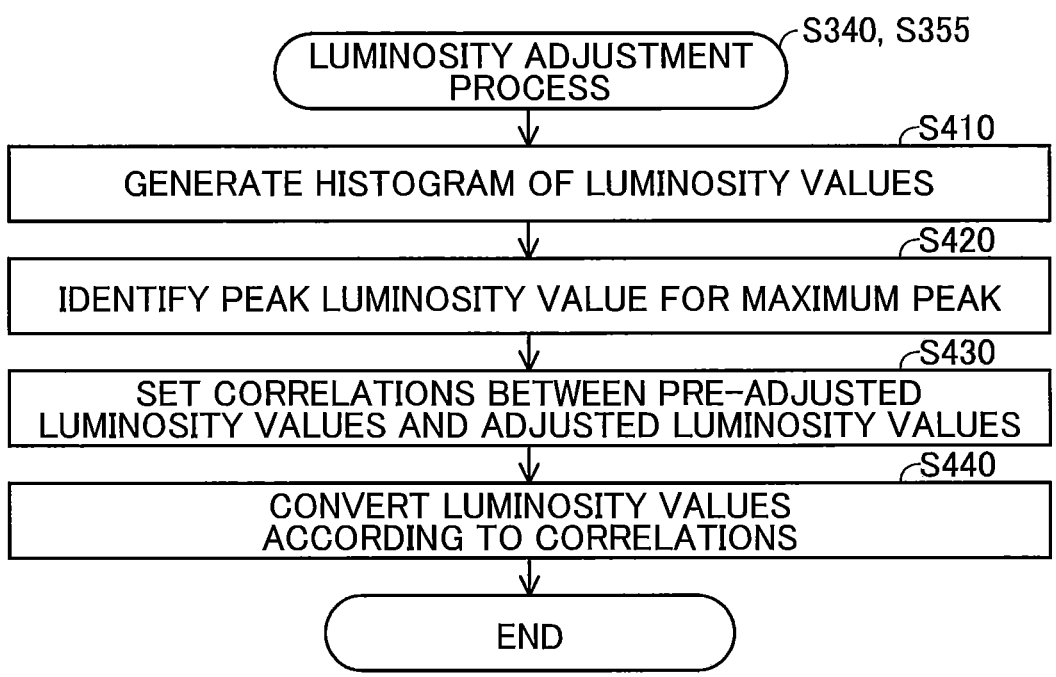
FIG. 8 is a flowchart illustrating a luminosity adjustment process.
Figure 9:
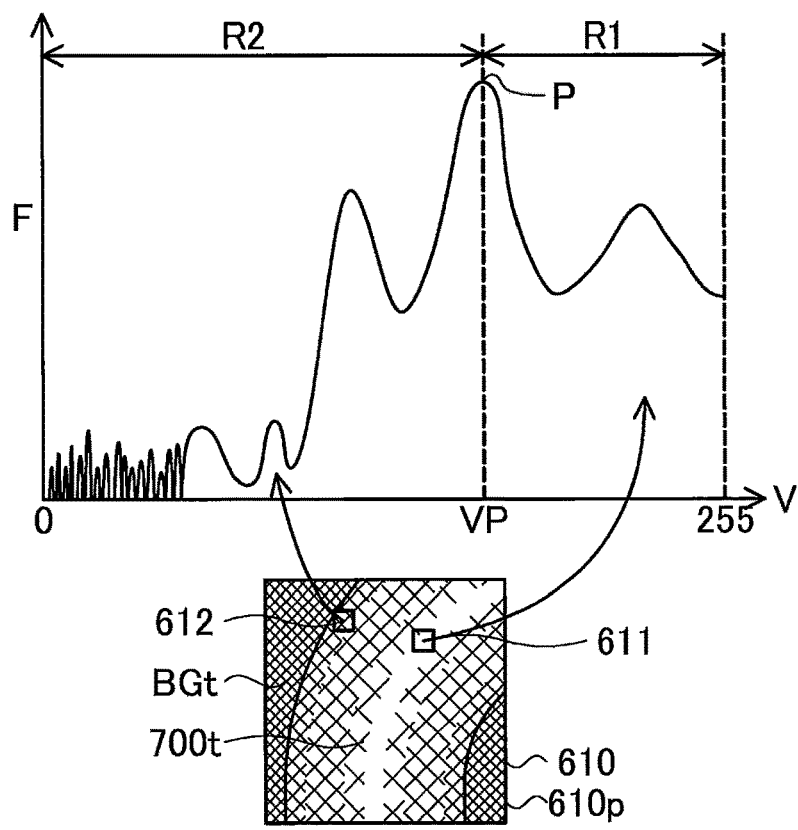
FIG. 9(A) is a graph showing a histogram of luminosity values in the first embodiment.
FIG. 9(B) is a graph showing correlations between luminosity values in the first embodiment.
Figure 9:
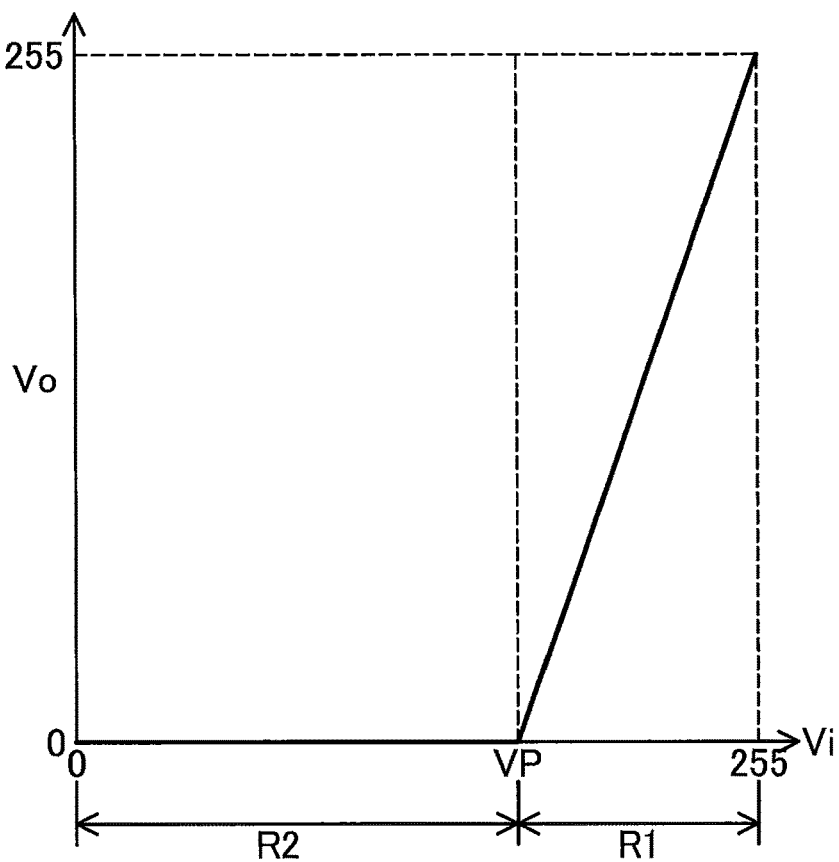

FIG. 8 is a flowchart illustrating steps in a luminosity adjustment process. In S410 of the process, the processor 210 generates a histogram of luminosity values in the image data. FIG. 9(A) is a graph showing a sample histogram of luminosity values, where the horizontal axis represents the luminosity value V and the vertical axis represents frequency F. A portion 610*p* of the target input image 610 is illustrated beneath the graph. In the embodiment, the luminosity value V is low in a portion 612 of the target product 700*t* near the background BGt and high in a portion 611 of the target product 700*t* far from the background BGt. Note that the peak for the luminosity value of the background BGt (0 in this example) set through the masking process of S315 has been omitted from FIG. 9(A).

In S420 of FIG. 8, the processor 210 analyzes the histogram to identify a peak luminosity value for the maximum peak (maximum frequency). The maximum peak (maximum frequency) is identified from among frequencies for luminosity values within a range of luminosity values V greater than 0 and smaller than the maximum possible luminosity value V (255 in this example). In the histogram shown in FIG. 9(A), the processor 210 identifies a peak luminosity value VP corresponding to a maximum peak (maximum frequency) P. In the target input image 610 shown in FIG. 7(B), the defect 710 may be rendered in darker color, and thus the luminosity value V of pixels representing the defect 710 are lower than the peak luminosity value VP.

In S430 of FIG. 8, the processor 210 sets correlations between the pre-adjusted luminosity values and the adjusted luminosity values. FIG. 9(B) is a graph showing sample correlations between luminosity values, where the horizontal axis represents the input luminosity value Vi (i.e., the pre-adjusted luminosity values) and the vertical axis represents the output luminosity value Vo (i.e., the adjusted luminosity values). In the embodiment, the output luminosity value Vo "0" is correlated with all the input luminosity value Vi within a second range R2 that is less than the peak luminosity value VP. That is, the output luminosity value Vo is 0 irrespective of the input luminosity values Vi when the input luminosity values Vi are within the second range R2. When the input luminosity values Vi are within a first range R1 that is greater than or equal to the peak luminosity value VP, the output luminosity value Vo increases from 0 to its maximum value (255 in this example) proportionally to the input luminosity value Vi as the input luminosity value Vi increases from the peak luminosity value VP to its maximum value (255 in this example). Such correlations are an example of correlations for enhancing contrast in the first range R1.

In S440 of FIG. 8, the processor 210 converts the luminosity value V according to the correlations set in S430. This step includes a process to enhance contrast for pixels having luminosity values Vi in the first range R1 which is greater than or equal to the peak luminosity value VP, and a process for setting luminosity values less than the peak luminosity value VP to 0. When the luminosity value V has been adjusted for all pixels, the process of FIG. 8, and hence the process in S340 of FIG. 6, ends.

FIG. 7(D) is an explanatory diagram showing a sample adjusted image 613 after luminosity values have been adjusted. The adjusted image 613 is an image obtained from the target input image 610 in FIG. 7(B). In the adjusted image 613, portions of the target product 700*t* adjacent to the background BGt are represented in the same black color as the background BGt.

In S345 of FIG. 6, the processor 210 generates the first comparison data by performing a noise reduction process on the target input image data produced from luminosity adjustments in S340. The noise reduction process may be any of various processes. In the embodiment, the processor 210 executes a thresholding process as the noise reduction process. Any of various thresholding processes may be performed to differentiate bright pixels from dark pixels. In the embodiment, the processor 210 executes Otsu's method of image thresholding. Otsu's method sets a threshold aimed by maximizing inter-class variance between bright pixels and dark pixels. The thresholding process reduces noise.

FIG. 7(E) is an explanatory diagram showing an example of a binarized image 616 produced through the thresholding process of S345. The binarized image 616 is an image obtained from the adjusted image 613 in FIG. 7(D). The pixels in the binarized image 616 are divided between bright pixels indicating part of the target product 700*t*, and dark pixels indicating the remaining portion of the target product 700*t* and the background BGt. Pixels indicating the defect 710 are classified as pixels different from their surrounding pixels (dark pixels different from the surrounding bright pixels, for example). Noise in the adjusted image 613 is reduced in the binarized image 616.

Through the process of S335 in FIG. 6, which includes steps S340 and S345 described above, the processor 210 generates the first comparison data using the target input image data. In the embodiment, the first comparison data is binary image data.

In S350, the processor 210 generates second comparison data using the target output image data. In the embodiment, the process of S350 includes steps S355 and S360. The processes in S355 and S360 are equivalent to the corresponding processes in S340 and S345, except that the image data subjected to the process in S350 is the target output image data acquired in S330 rather than the target input image data.

FIG. 7(F) is an explanatory diagram showing an adjusted image 623 whose luminosity values have been adjusted in S355. The adjusted image 623 is an image obtained from the target output image 620 in FIG. 7(C). In the adjusted image 623, the portion of the target product 700t adjacent to the background BGt is rendered in the same black color as the background BGt.

FIG. 7(G) is an explanatory diagram showing an example of a binarized image 626 produced through the thresholding process in S360. The binarized image 626 is an image obtained from the adjusted image 623 in FIG. 7(F). The pixels in the binarized image 626 have been divided between bright pixels representing part of the target product 700t, and dark pixels primarily representing the background BGt. Noise in the adjusted image 623 has been reduced in the binarized image 626.

Figure 10:
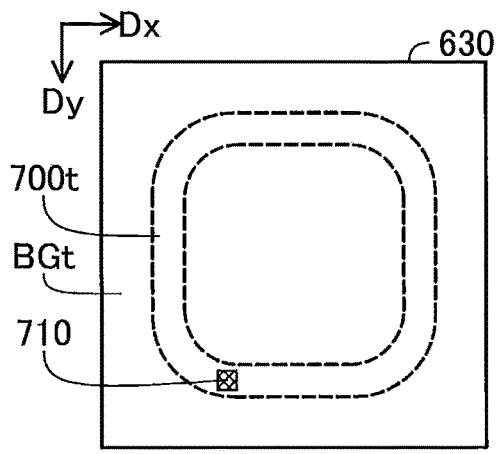
FIG. 10(A) is an explanatory diagram showing a differential image.
FIG. 10(B) is an explanatory diagram showing a reduced image of the differential image.
FIG. 10(C) is an explanatory diagram showing an example of an inspection image.
FIG. 10(D) is an explanatory diagram showing another example of an inspection image.
FIG. 10(E) is an explanatory diagram showing a composite image.
Figure 10:
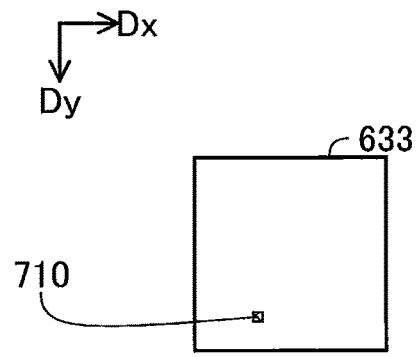
Figure 10:
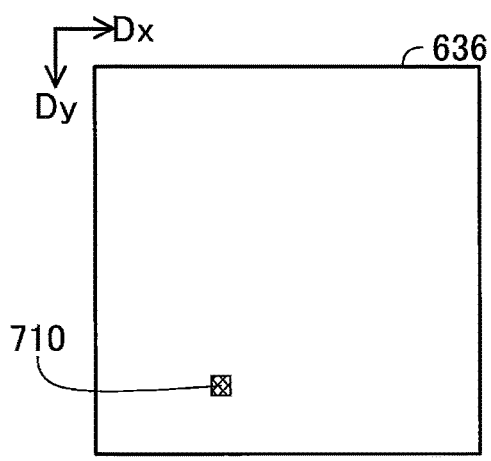
Figure 10:
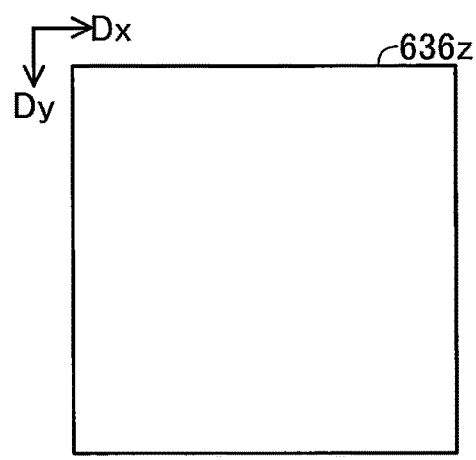
Figure 10:
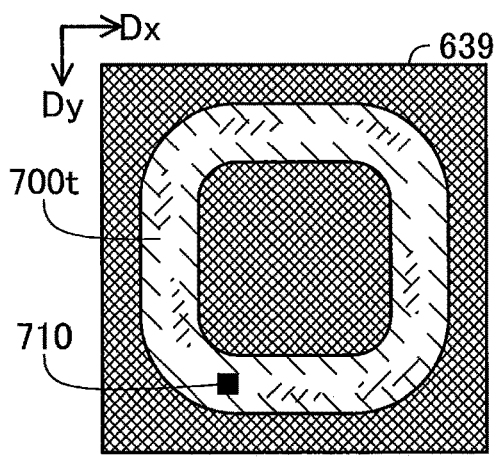

In S365 of FIG. 6, the processor 210 generates inspection image data using the differences between the first comparison data and the second comparison data. The inspection image data represents an image to be inspected. In the embodiment, the process of S365 includes steps S370 and S375. In S370 the processor 210 generates differential image data showing differences between the first comparison data and the second comparison data. In the embodiment, the color value for each pixel in the differential image data is an absolute value of a value obtained by subtracting a color value for a pixel in the first comparison data from color value for the same pixel in the second comparison data. FIG. 10(A) is an explanatory diagram showing a sample differential image 630. Portions in the differential image 630 having a large color value (i.e., a large difference) have been shaded. As shown in FIG. 10(A), when the target product 700t possesses a defect 710, the area depicting the defect 710 has a large difference. The differential image data may also include noise. In the example of FIG. 10(A), areas representing the contours of the target product 700t have a large difference. Those contours are to be treated as noise as described below.

In S375 of FIG. 6, the processor 210 performs a noise reduction process on the differential image data to generate inspection image data. The noise reduction process may be any of various processes. In the embodiment, the processor 210 sequentially executes an image reduction process and an image enlargement process as the noise reduction process. The image reduction process is a process for reducing the resolution (i.e., decreasing pixel density). In the embodiment, the image is reduced without interpolating color values. For example, a plurality of pixels that is distributed evenly within the image are removed. This image reduction process removes minor noise. FIG. 10(B) shows an example of a reduced image 633 obtained by performing the image reduction process on the differential image 630 in FIG. 10(A). Noise depicting contours of the target product 700t have been removed in the reduced image 633. The image enlargement process is a process for increasing resolution (i.e., increasing pixel density). In the embodiment, the image is enlarged without interpolating color values. For example, each pixel in the image is copied to neighboring positions. The image enlargement process returns the image to its original resolution.

FIG. 10(C) shows an example of an inspection image 636 obtained by performing the image enlargement process in the reduced image 633 in FIG. 10(B). The inspection image 636 has less noise than in the original differential image 630 of FIG. 10(A). However, the defect 710 remains in the inspection image 636. Thus, when the target product 700t has the defect 710, the processor 210 generates inspection image data depicting the defect 710.

FIG. 10(D) shows another example of an inspection image 636z obtained by performing an image enlargement process. The example of inspection image 636z is obtained when the target product has no defects. As with the inspection image 636 in FIG. 10(C), noise has been reduced in the inspection image 636z. Consequently, the areas depicting the product have been removed. In this way, the processor 210 generates inspection image data with no areas depicting the product when the target product has no defects.

In S365 of FIG. 6, which includes steps S370 and S375 described above, the processor 210 generates the inspection image data. After completing the process of S365, the process in FIG. 6, and consequently step S210 of FIG. 5, is completed.

In S220 the processor 210 determines whether the inspection image includes areas with a specific color. In the embodiment, the processor 210 searches for pixels with a color value exceeding a predetermined threshold (i.e., a pixel having a difference greater than or equal to the threshold value) as areas with the specific color. As described with reference to FIGS. 10(C) and 10(D), the inspection image includes areas of the specific color representing a defect when the target product 700t has a defect, and does not include areas of the specific color when the target product has no defects.

When the inspection image has no areas with the specific color (S220: NO), in S230 the processor 210 determines that the target product has no defects, and subsequently ends the process in FIG. 5. In this case, the target product is used in the production of the devices.

However, if the processor 210 determines that the inspection image includes an area with the specific color (S220: YES), in S240 the processor 210 determines that the target product has a defect. In S250 the processor 210 generates composite image data by combining the target input image data with the inspection image data. FIG. 10(E) is an explanatory diagram showing a sample composite image 639 represented by the composite image data. The composite image 639 is obtained by adding the portions of the 636 in FIG. 10(C) having the specific color to the target input image 610 in FIG. 7(B). The area with the specific color in the composite image 639 represents the defect 710. Areas with the specific color are rendered in a predetermined color (black or red, for example).

In S260 the processor 210 displays the composite image on the display 240. By viewing the composite image displayed on the display 240, the user can easily identify the position of the defect. Subsequently, the processor 210 ends the process in FIG. 5.

In the embodiment described above, the processor 210 generates inspection image data by executing the process in FIG. 6. Specifically, through S310 and S315 the processor 210 acquires target input image data representing a captured image of the product being inspected. Through S320-S330 the processor 210 acquires target output image data representing the target output image 620 by inputting the target input image data into the pre-trained model 234. Here, the target output image 620 is an image of the product being inspected, excluding any defects. As described with reference to FIGS. 3 and 4, the pre-trained model 234 is trained to output image data representing an image of the same product represented by the input image data, but free from defects, through a process of compressing and decompressing the input image data that was inputted into the pre-trained model 234. In S335 the processor 210 generates first comparison data by performing a generation process on the target input image data that includes a luminosity adjustment process (S340). In S350 the processor 210 generates second comparison data by performing a generation process on the target output image data that includes a luminosity adjustment process (S355). In S365 the processor 210 generates inspection image data representing an image for inspection using the difference between the first comparison data and the second comparison data (S370). In this way, the inspection image data is generated using the difference between the first comparison data and the second comparison data. Here, the first comparison data is generated by performing a generation process that includes a luminosity adjustment process on the target input image data. The second comparison data is generated by performing a generation process that includes a luminosity adjustment process on the target output image data acquired using the trained model. Accordingly, when the product being inspected has defects, the inspection image data can accurately represent those defects.

Further, as described with reference to FIGS. 8, 9(A), and 9(B), the luminosity adjustment process in S340 and S355 of FIG. 6 is a process for enhancing contrast for pixels having the luminosity values Vi in the first range R1. The first range R1 is an example of a target luminosity range constituting a portion of the entire possible range of luminosity values. The target luminosity range is identified using the distribution of luminosity values. Thus, luminosity is adjusted using the target luminosity range identified from the distribution of luminosity values. Therefore, differences in brightness between the first comparison data and the second comparison data can be reduced, even when the same areas of a product have different levels of brightness between the target input image data and the target output image data. As described above, the inspection image data is generated using differences between the first comparison data and the second comparison data. Such inspection image data can accurately represent defects rendered by the first comparison data but not rendered by the second comparison data.

In the embodiment, the inspection image data is generated using image data for comparison. The image data for comparison enhances contrast for pixels having luminosity values Vi within a target luminosity range identified based on the distribution of luminosity values. When a product being inspected has a defect, enhancing contrast increases the difference in color values between defective parts and non-defective parts of the target product. Thus, the defects can be rendered accurately in the inspection image data. For example, as shown in FIG. 7(B), because pixels representing the defect 710 have darker colors, and thus have luminosity values Vi outside the first range R1. These luminosity values Vi are converted to the luminosity values Vo of 0. In this case, because the pixels representing the defect 710 have luminosity values Vo different from the luminosity values Vo representing the product without defects. Accordingly, the difference in luminosity can be increased between parts of the product in the image corresponding to defects and parts not corresponding to defects when the product being inspected has defects. On the other hand, if pixels representing the defects have luminosity values Vi within the first range R1, contrast for these pixels are enhanced together with pixels representing part of the product without defects. Accordingly, the difference in luminosity can be increased between parts of the product in the image corresponding to defects and parts not corresponding to defects when the product being inspected has defects.

As described with reference to FIGS. 8, 9(A), and 9(B), the luminosity adjustment process includes a process for enhancing contrast of pixels having luminosity values Vi in the first range R1, and a process for setting luminosity values less than the peak luminosity value VP to 0. The first range R1 is a range of luminosity values greater than or equal to the peak luminosity value VP that is identified based on the distribution of luminosity values. The peak luminosity value VP is an example of the statistic. Since this luminosity adjustment process enhances contrast in areas of the image representing the target product, the difference in luminosity is increased between parts of the product in the image corresponding to defects and parts not corresponding to defects when the product being inspected has defects. Thus, defects can be rendered suitably in the inspection image data.

As described in FIGS. 8 and 9(A), the peak luminosity value VP is a luminosity value corresponding to the largest peak (largest frequency) in the distribution of luminosity values within the range of luminosity values greater than 0 and smaller than the largest possible luminosity value (255 in this case). This type of peak luminosity value VP serves as an index indicating the brightness of the product in the image. Correlations for adjusting luminosity in the target input image data are identified using the peak luminosity value VP obtained from the target input image data, and correlations for adjusting luminosity in the target output image data are identified using the peak luminosity value VP obtained from the target output image data. Therefore, the difference in brightness between the first comparison data and the second comparison data can be reduced, even when the brightness differs for identical parts of the product in the target input image data and the target output image data. Further, the contrast is enhanced for pixels having luminosity values Vi in the first range R1, which includes a large number of pixels representing the product. Therefore, when the product being inspected has defects, the difference in luminosity is increased between parts of the product in the image corresponding to defects and parts not corresponding to defects. Thus, defects can be accurately represented in the inspection image data.

As described in FIG. 6, each of the generation processes in S335 and S350 include a noise reduction process (S345, or S360) following the luminosity adjustment process (S340, or S355). Therefore, when the product being inspected has defects, those defects can be accurately represented in the inspection image data, since the effects of noise are mitigated.

As described in FIG. 6, the noise reduction processes of S345 and S360 include a thresholding process. Thus, when the product being inspected has defects, those defects can be accurately represented in the inspection image data since the effects of noise are properly mitigated through the thresholding process.

B. Second Embodiment

Figure 11:
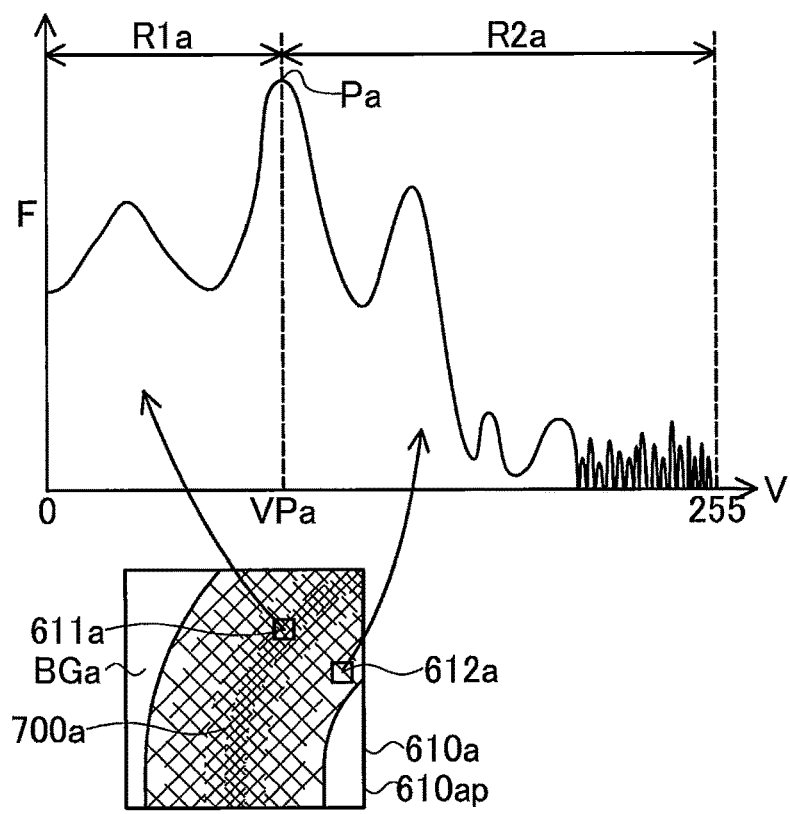
FIG. 11(A) is a graph showing a histogram of luminosity values in a second embodiment.
FIG. 11(B) is a graph showing correlations between luminosity values in the second embodiment.
Figure 11:
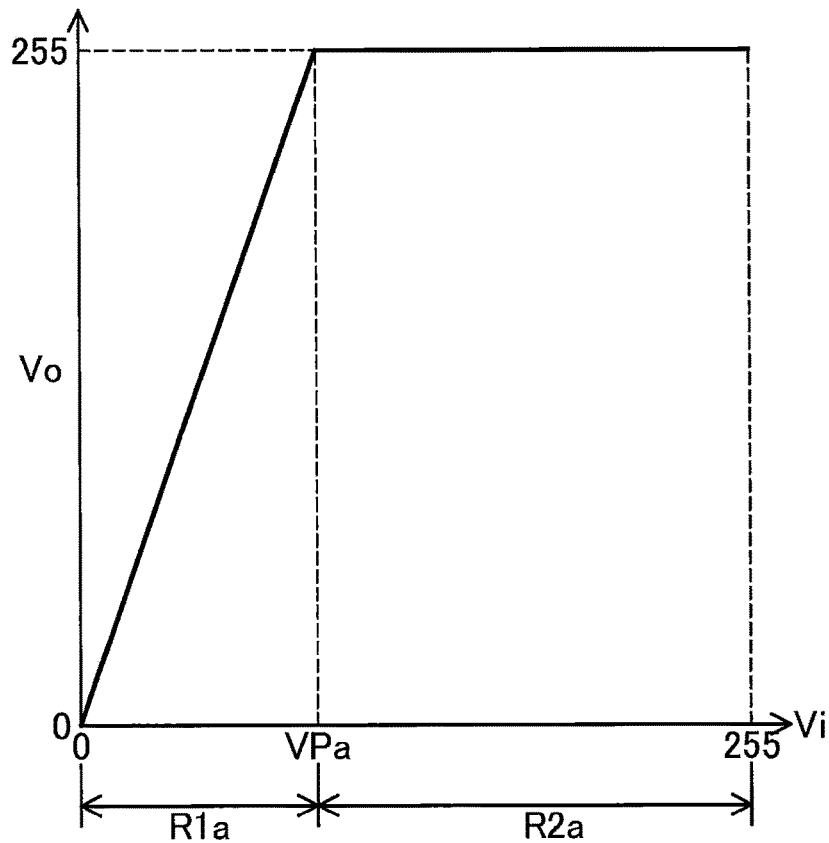

FIGS. 11(A) and 11(B) are explanatory diagrams showing a second embodiment of the luminosity adjustment process in S340 and S355 of FIG. 6. Similar to FIGS. 9(A) and 9(B), FIGS. 11(A) and 11(B) show a histogram, a portion 610ap of a target input image 610a, and correlations between the input luminosity value Vi and the output luminosity value Vo. In the second embodiment, a target product 700a in the target input image 610a is darker than a background BGa. When the product has a darker color, the target product 700a is rendered in the target input image 610a using a darker color than the background BGa, for example. In this case, the luminosity value V is high in a portion 612a of the target product 700a near the background BGa, and low in a portion 611a of the target product 700a far from the background BGa. Note that the luminosity value for the background BGa in the second embodiment is set to the largest possible value (255 in this case) in the masking process of S315. The peak corresponding to the luminosity value for the background BGa in the histogram has been omitted from the drawing.

The luminosity adjustment process according to the second embodiment is executed according to the same procedure in FIG. 8. In S410 of the process, the processor 210 generates a histogram of luminosity values V, and in S420 identifies the maximum peak (maximum frequency). The maximum peak (maximum frequency) is identified from among frequencies corresponding to luminosity values V within a range of luminosity values V greater than 0 and smaller than the maximum possible luminosity value V (255 in this example). In the histogram shown in FIG. 11(A), the processor 210 identifies a peak luminosity value VPa corresponding to a maximum peak (maximum frequency) Pa.

In S430 of FIG. 8, the processor 210 sets correlations between the pre-adjusted luminosity values and the adjusted luminosity values. As shown in FIG. 11(B), the output luminosity value Vo of the maximum value (255 in this case) is correlated with all the input luminosity values Vi within a second range R2a exceeding the peak luminosity value VPa. That is, the output luminosity value Vo is the maximum value (255 in this case) irrespective of the input luminosity values Vi when the input luminosity values Vi are within the second range R2a. When the input luminosity values Vi are within a first range R1a that is less than or equal to the peak luminosity value VPa, the output luminosity value Vo increases proportionally to the input luminosity value Vi as the input luminosity value Vi increases from 0 to the peak luminosity value VPa. Such correlations are an example of correlations for enhancing contrast in the first range R1a.

In S440 of FIG. 8, the processor 210 converts the luminosity value V according to the correlations set in S430. When the luminosity value V has been adjusted for all pixels, the process of FIG. 8 ends.

As described above, the luminosity adjustment process according to the second embodiment includes a process to enhance contrast for pixels having luminosity values Vi in the first range R1a of luminosity values, and a process to set luminosity values that exceed the peak luminosity value VPa to the maximum possible luminosity value. The first range R1a is a range of luminosity values less than or equal to the peak luminosity value VPa that is identified based on the distribution of luminosity values. The peak luminosity value VPa is an example of the second statistic. Since this luminosity adjustment process enhances contrast in areas of the image representing the target product, the difference in luminosity is increased between parts of the product in the image corresponding to defects and parts not corresponding to defects when the product being inspected has defects. Thus, defects can be rendered suitably in the inspection image data.

As described above in FIG. 11(A), the peak luminosity value VPa is a luminosity value corresponding to the largest peak (largest frequency) in the distribution of luminosity values within the range of luminosity values greater than 0 and smaller than the largest possible luminosity value (255 in this case). This peak luminosity value VPa serves as an index indicating the brightness of the product in the image. Therefore, the difference in brightness between the first comparison data and the second comparison data can be reduced, even when the brightness differs for identical parts of the product in the target input image data and the target output image data, as in the first embodiment described above. Further, the contrast is enhanced for pixels having luminosity values Vi in the first range R1a, where those pixels include a large number of pixels representing the product. Therefore, when the product being inspected has defects, the difference in luminosity is increased between parts of the product in the image corresponding to defects and parts not corresponding to defects. Thus, since parts of the target product in the image corresponding to defects can be easily separated from parts not corresponding to defects, the inspection image data can accurately represent the defects.

C. Third Embodiment

Figure 12:
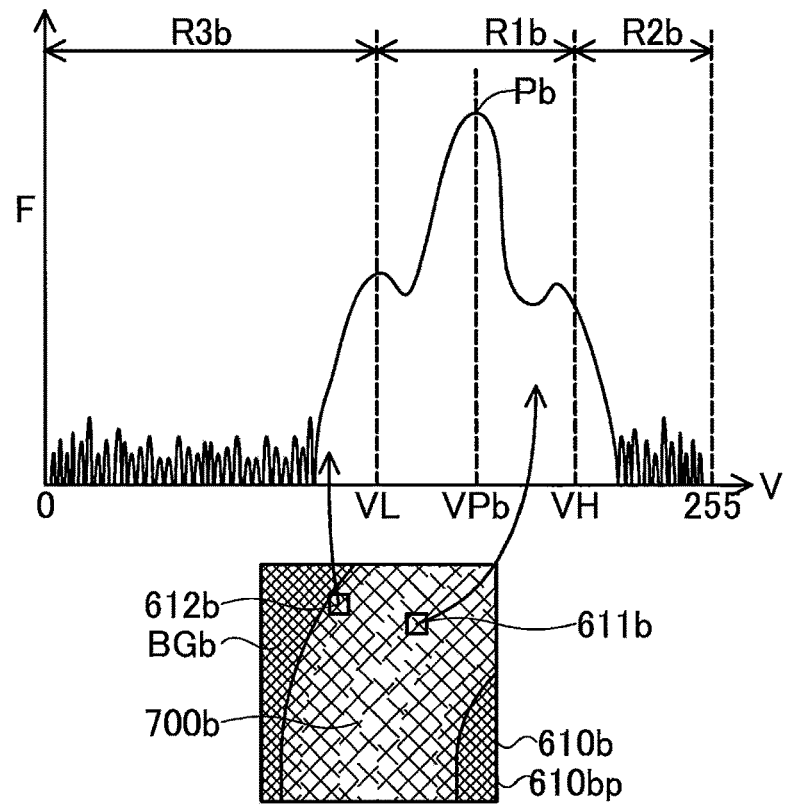
FIG. 12(A) is a graph showing a histogram of luminosity values in a third embodiment.
FIG. 12(B) is a graph showing correlations between luminosity values in the third embodiment.
Figure 12:
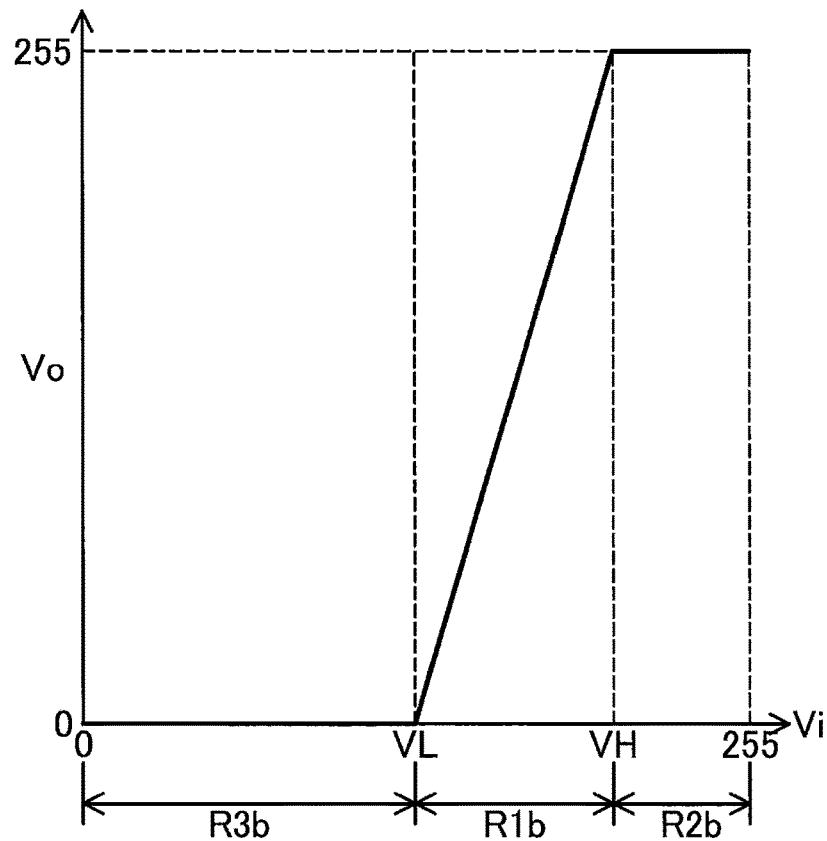

FIGS. 12(A) and 12(B) are explanatory diagrams showing a third embodiment of the luminosity adjustment process in S340 and S355 of FIG. 6. Similar to FIGS. 9(A) and 9(B), FIGS. 12(A) and 12(B) show a histogram, a portion 610bp of a target input image 610b, and correlations between the input luminosity value Vi and the output luminosity value Vo. In the third embodiment, a target product 700b is represented by moderate level luminosity values V in the target input image 610b. A background BGb is darker than the target product 700b. Pixels having large luminosity values V approaching the maximum value (255) indicate noise, and not the target product 700b. In the example of FIG. 12(A), the luminosity value V is low in a portion 612b of the target product 700b near the background BGb, and high in a portion 611b of the target product 700b far from the background BGb. In the embodiment, the luminosity value for the background BGb is set to 0 in the masking process of S315. The peak corresponding to the luminosity value for the background BGb in the histogram has been omitted from the drawing.

A luminosity adjustment process according to the third embodiment is executed according to the same procedure shown in FIG. 8. In S410 of the process, the processor 210 generates a histogram of luminosity values V, and in S420 identifies the maximum peak (maximum frequency). The maximum peak (maximum frequency) is identified from among frequencies corresponding to luminance values within a range of luminosity values V greater than 0 and smaller than the maximum possible luminosity value V (255 in this example). In the histogram shown in FIG. 12(A), the processor 210 identifies a peak luminosity value VPb corresponding to a maximum peak (maximum frequency) Pb.

In S430 of FIG. 8, the processor 210 sets correlations between the pre-adjusted luminosity values and the adjusted luminosity values. As shown in FIGS. 12(A) and 12(B), the processor 210 in the third embodiment identifies a first range R1b of luminosity values centered on the peak luminosity value VPb and having a predetermined width. The first range R1b is defined by a lower limit VL and an upper limit VH in the drawing. The output luminosity value Vo of the maximum value (255 in this case) is correlated with all the input luminosity values Vi within a second range R2b exceeding the upper limit VH. That is, the output luminosity value Vo is the maximum value (255 in this case) irrespective of the input luminosity values Vi when the input luminosity values Vi are within the second range R2b. The output luminosity value Vo of "0" is correlated with all the input luminosity values Vi within a third range R3b that is less than the lower limit VL. That is, the output luminosity value Vo is "0" irrespective of the input luminosity values Vi when the input luminosity values Vi are within the third range R3b. When the input luminosity value Vi is within the first range R1b, the output luminosity value Vo increases proportionally to the input luminosity value Vi as the input luminosity value Vi increases from the lower limit VL to the upper limit VH. Such correlations are an example of correlations for enhancing contrast for pixels having luminosity values Vi in the first range R1b.

In S440 of FIG. 8, the processor 210 converts the luminosity value V according to the correlations set in S430. When the luminosity value V has been adjusted for all pixels, the process of FIG. 8 ends.

As described above, the luminosity adjustment process according to the third embodiment includes a process to enhance contrast for pixels having luminosity values Vi in the first range R1b of luminosity values, a process to set luminosity values below the lower limit VL to 0, and a process to set luminosity values above the upper limit VH to the maximum possible luminosity value (255 in this case). The first range R1b is a range of luminosity values between the lower limit VL and the upper limit VH that is identified based on the distribution of luminosity values. Since this luminosity adjustment process enhances contrast in areas of the image representing the target product, the difference in luminosity is increased between parts of the product in the image corresponding to defects and parts not corresponding to defects when the product being inspected has defects. Thus, since parts of the target product in the image corresponding to defects can be easily separated from parts not corresponding to defects, the inspection image data can accurately represent the defects.

As described above in FIG. 12(A), the first range R1b is a range that includes the peak luminosity value VPb. The peak luminosity value VPb is a luminosity value corresponding to the largest peak (maximum frequency) in the distribution of luminosity values within the range of luminosity values greater than 0 and smaller than the largest possible luminosity value (255 in this case). This peak luminosity value VPb serves as an index indicating the brightness of the product in the image. Therefore, the difference in brightness between the first comparison data and the second comparison data can be reduced, even when the brightness differs for identical parts of the product in the target input image data and the target output image data, as in the first embodiment described above. Further, the contrast is enhanced for pixels having luminosity values Vi in the first range R1b, where those pixels include a large number of pixels representing the product. Therefore, when the product being inspected has defects, the difference in luminosity is increased between parts of the product in the image corresponding to defects and parts not corresponding to defects. Thus, the inspection image data can accurately represent the defects.

D. Variations of the Embodiments (1) The prediction model that outputs image data representing an image of the product may have any of various other structures in place of the structure of the autoencoder NN in FIG. 2. For example, the layers that perform data compression (i.e., a process to reduce the amount of data) may be various layers for compressing data in place of the max pooling layers, as in the pooling layers 316, 326, and 336. For example, average pooling layers may be used. Alternatively, the pooling layers may be eliminated, and data may be compressed using convolutional layers (at least one of the convolutional layers 313, 323, and 333, for example). In addition, the total number of layers performing data compression need not be 3, but may be any number (between 1 and 5, for example).

Further, layers that perform data decompression (i.e., a process to increase the amount of data) may be any of various layers that decompress data in place of the upsampling layers 346, 356, and 366. For example, deconvolutional layers may be used. Additionally, the convolutional layers 343, 353, and 363 may be omitted. Further, the total number of layers that perform data decompression need not be 3, but may be any number (between 1 and 5, for example). The total number of layers performing data decompression may be the same as the total number of layers performing data compression.

In this way, the prediction model may be provided with one or more convolutional layers as the layers performing data compression. For example, the prediction model may have one or more sets that include a convolutional layer and a pooling layer connected to the output side of the convolutional layer. Alternatively, the prediction model may be provided with one or more sets of a convolutional layer and an upsampling layer connected to the output side of the convolutional layer, as layers performing data decompression. Alternatively, the prediction model may be provided with one or more deconvolutional layers as the layers performing data decompression.

The prediction model need not include convolutional layers but may be configured of a plurality of fully-connected layers. The prediction model may include various artificial neural networks known as autoencoders. Alternatively, the prediction model is not limited to artificial neural networks, but may include various other models. For example, the prediction model may include one or more models selected arbitrarily from a group of artificial neural networks, hidden Markov models, and inference engines. In general, the prediction model should be a variety of models that output image data representing an image of a product by performing data compression and data decompression on image data representing an image of the same product inputted into the prediction model. With this type of prediction model, information specifying defects is removed through data compression when the product has defects. Accordingly, the prediction model can easily output image data representing an image of the same product, only without defects.

(2) The method of training the prediction model may be any of various methods in place of the method described in FIG. 3. For example, the training image data inputted into the prediction model may be image data obtained by adding noise to the captured image data. In this case as well, it is preferable to use image data without added noise as the supervised image data. In general, the training method is any method of inputting image data representing an image of the product into the prediction model and training the prediction model to output image data representing an image of the same product, but having no defects.

(3) The luminosity adjustment process (S340, S355 of FIG. 6) included in the process for generating comparison image data may include various other processes and is not limited to the process described in FIG. 8. For example, various other statistics identified using the distribution of luminosity values may be used in place of the peak luminosity values VP, VPa, and VPb. The statistic may be one of the peak luminosity for the largest peak (maximum frequency), the median luminosity, or the average luminosity based on the distribution of luminosity values within a luminosity range greater than 0 and smaller than the maximum possible value, for example. The luminosity range in which contrast is enhanced may be any of various ranges identified based on the distribution of luminosity values. For example, the processor 210 identifies the two valleys on either side of the maximum peak in the distribution of luminosity values. Here, among the two valleys, the valley for luminosity values lower than the peak luminosity is referred to as the "lower-luminosity valley", and the valley for luminosity values higher than the peak luminosity is referred to as the "higher-luminosity valley". The processor 210 may employ the luminosity value corresponding to the minimum frequency in the lower-luminosity valley as the lower limit and the luminosity value corresponding to the minimum frequency in the higher-luminosity valley as the upper limit. In any case, the luminosity range is preferably set such that luminosity values for pixels representing defects in the product fall outside the luminosity range in which contrast is enhanced. Further, the processor 210 preferably sets luminosity values outside the luminosity range for enhancing contrast to a predetermined value (0 or the maximum possible value, for example).

The processor 210 may also select the correlations to be used for luminosity adjustments from the correlations in FIG. 9(B) and the correlations in FIG. 11(B) based on a luminosity distribution (the luminosity distribution in the target input image, for example). For example, if the number of pixels having a luminosity value greater than or equal to the statistic (the peak luminosity value, for example) is greater than the number of pixels whose luminosity value is less than the statistic, the processor 210 may select the correlations in FIG. 9(B). Conversely, when the number of pixels whose luminosity value is greater than or equal to the statistic is fewer than the number of pixels whose luminosity value is less than the statistic, the processor 210 may select the correlations in FIG. 11(B).

The luminosity adjustment process may also be a process for enhancing contrast for pixels having luminosity values Vi in a predetermined luminosity range. In general, the luminosity adjustment process is a variety of processes that reduce the difference in brightness between the first comparison data and the second comparison data.

(4) The method for setting a threshold value for the thresholding process included in the process to generate comparison image data (S345, S360 of FIG. 6) may be any of various methods in place of Otsu's method. For example, the processor 210 may use the luminosity distribution in the luminosity range greater than 0 and less than the maximum possible value to set the threshold value (for example, the threshold value may be the average or the median luminosity value). The threshold value may also be predetermined. The noise reduction process included in the process for generating comparison image data may be any process that reduces noise in place of the thresholding process. For example, the noise reduction process may be a process that reduces noise using an unsharp mask. Note that the noise reduction process may also be omitted.

(5) The process for generating inspection image data may be any of various processes in place of the process in FIG. 6. For example, the masking process in S315 may be omitted. The noise reduction process of S375 is not limited to the image reduction process and image enlargement process, but may include any process that reduces noise. For example, the noise reduction process may include a process for contracting and a process for expanding objects in the image. The contraction process removes minor noise. The noise reduction process may also include a process for reducing noise using an unsharp mask. Further, the thresholding process in S345 and S360 may be omitted, and a thresholding process may instead be performed after the noise reduction process of S375. The noise reduction process in S375 may also be omitted.

The prediction model (the autoencoder NN of FIG. 2, for example) may also be configured to perform processes based on color image data (RGB bitmap data, for example) instead of grayscale image data. The training process of FIG. 3 and the process for generating inspection image data of FIG. 6 may also be executed using color image data.

(6) The training process of FIG. 3 may be executed on a different device than the device that executes the process in FIG. 6 for generating inspection image data. In the embodiment of FIG. 5, the same data-processing apparatus 200 (see FIG. 1) executes both the generation process for generating inspection image data and the determination process for determining whether the product has defects based on the inspection image data. In this case, the data-processing apparatus 200 is an example of the generation apparatus for generating inspection image data and an example of the determination apparatus for executing the determination process. Note that an apparatus different from the generation apparatus for generating inspection image data may be operated as a determination apparatus for determining whether the product has defects. The processes performed when the product is determined to have defects may be any other processes in place of the processes for generating and displaying a composite image (S250, S260 of FIG. 5).

(7) The products subjected to inspection may be a variety of products, and the defects to be detected in the inspection may be a variety of defects. For example, the product may be paper that is used in printing. In this case, a defect may be a fold in the paper. Alternatively, the product may be paper on which a printer has printed a nozzle checking pattern. In this case, the defect may be a problem with the nozzles indicated in the checking pattern (nozzle clogging, for example).

(8) The apparatus that generates inspection image data may be a variety of apparatuses other than a personal computer (a multifunction peripheral, printer, scanner, digital camera, or smartphone, for example). Further, a plurality of apparatuses that can communicate over a network (computers, for example) may each implement some of the functions in the process for generating inspection image data so that the apparatuses as a whole can provide the functions required for generating inspection image data. Here, the system includes these apparatuses corresponds to the generation apparatus for generating inspection image data. This aspect also applies to the determination apparatus that determines whether a product has defects based on the inspection image data.

At least part of the configuration of the invention implemented in hardware in the embodiment described above may be replaced by software and, conversely, at least part of the configuration of the embodiment implemented in software may be replaced by hardware. For example, the pre-trained model 234 is implemented by hardware circuits such as an ASIC (Application Specific Integrated Circuit) instead of the program module.

When all or part of the functions in the present disclosure are implemented by computer programs, the programs can be stored on a computer-readable storage medium (a non-temporary storage medium, for example). The programs may be used from the same storage medium on which they are provided (an example of a computer-readable storage medium), or may be first loaded onto a different storage medium (an example of a computer-readable storage medium). The "computer-readable storage medium" may be a portable medium, such as a memory card or CD-ROM; an internal storage device built into the computer, such as any of various ROM; or an external storage device, such as a hard disk drive connected to the computer.

While the disclosure has been described in detail with reference to the above embodiments, it would be apparent to those skilled in the art that various changes and modifications may be made thereto.

What is claimed is:

1. An image data generating apparatus comprising an image processor configured to perform:
   acquiring target output image data that is converted from target input image data by a pre-trained model, the target input image data representing a captured image of a target product, the target output image data representing an image of a target product free from defects, the pre-trained model being configured to perform data compression and data decompression on image data inputted to the pre-trained model, wherein the pre-trained model is trained so that when image data representing an input image of the target product is inputted to the pre-trained model, the pre-trained model outputs image data representing an image of the target product free from defects irrespective of whether the input image includes a defect or not;
   generating first data by performing a first generation process on the target input image data, the first generation process including a luminosity adjustment process, the luminosity adjustment process adjusting luminosity in image data inputted to the luminosity adjustment process;
   generating second data by performing a second generation process on the target output image data converted from the target input image data by the pre-trained model in the acquiring, the second generation process including the luminosity adjustment process; and
   generating inspection image data by using a difference between the first data and the second data, the inspection image data being used for inspecting an external appearance of the target product.

2. The image data generating apparatus according to claim 1, wherein the image data subject to the luminosity adjustment process has pixels and a luminosity value for each pixel, each luminosity value being capable of taking any value within a predetermined range, the luminosity adjustment process specifying a partial range of the predetermined range by using distribution of luminosity values in the image data, and enhancing contrast for pixels having luminosity values in the partial range.

3. The image data generating apparatus according to claim 2, wherein the luminosity adjustment process including at least one of a first adjustment process, a second adjustment process, and a third adjustment process,
   wherein the first adjustment process specifies a first statistic indicating a luminosity value by using the distribution of the luminosity values, enhances contrast for pixels having luminosity values in a range larger than or equal to the first statistic, and converts luminosity values in a range smaller than the first statistic to a minimum value of the predetermined range,
   wherein the second adjustment process specifies a second statistic indicating a luminosity value by using the distribution of the luminosity values, enhances contrast for pixels having luminosity values in a range smaller than or equal to the second statistic, and converts luminosity values in a range larger than the second statistic to a maximum value of the predetermined range,
   wherein the third adjustment process specifies a specific range of the luminosity values by using the distribution of the luminosity values, the specific range being between an upper limit and a lower limit, the third adjustment process enhances contrast for pixels having luminosity values in the specific range, converts each luminosity value at the lower limit to the minimum value of the predetermined range, and converts each luminosity value at the upper limit to the maximum value of the predetermined range.

4. The image data generating apparatus according to claim 3, wherein each of the first statistic and the second statistic is a luminance value having a maximum frequency among luminance values larger than the minimum value of the predetermined range and lower than the maximum value of the predetermined range.

5. The image data generating apparatus according to claim 1, wherein each of the first generation process and the second generation process includes a noise reduction process for reducing noise in image data inputted to the noise reduction process, the noise reduction process being executed after the luminance adjustment process.

6. The image data generating apparatus according to claim 5, wherein the noise reduction process includes a thresholding process for thresholding pixel values included in image data inputted to the thresholding process.

7. A non-transitory computer readable storage medium storing a set of program instructions installed on and executed by a computer included in an image generating apparatus, the set of first program instructions, when executed by the computer, causing the image generating apparatus to perform:
   acquiring target output image data that is converted from target input image data by a pre-trained model, the target input image data representing a captured image of a target product, the target output image data representing an image of a target product free from defects, the pre-trained model being configured to perform data compression and data decompression on image data inputted to the pre-trained model, wherein the pre-trained model is trained so that when image data representing an input image of the target product is inputted to the pre-trained model, the pre-trained model outputs image data representing an image of the target product free from defects irrespective of whether the input image includes a defect or not;
   generating first data by performing a first generation process on the target input image data, the first generation process including a luminosity adjustment process, the luminosity adjustment process adjusting luminosity in image data inputted to the luminosity adjustment process;
   generating second data by performing a second generation process on the target output image data converted from the target input image data by the pre-trained model in the acquiring, the second generation process including the luminosity adjustment process; and generating inspection image data by using a difference between the first data and the second data, the inspection image data being used for inspecting an external appearance of the target product.

8. The non-transitory computer readable storage medium according to claim 7, wherein the image data subject to the luminosity adjustment process has pixels and a luminosity value for each pixel, each luminosity value being capable of taking any value within a predetermined range, the luminosity adjustment process specifying a partial range of the predetermined range by using distribution of luminosity values in the image data, and enhancing contrast for pixels having luminosity values in the partial range.

9. The non-transitory computer readable storage medium according to claim 8, wherein the luminosity adjustment process including at least one of a first adjustment process, a second adjustment process, and a third adjustment process,
wherein the first adjustment process specifies a first statistic indicating a luminosity value by using the distribution of the luminosity values, enhances contrast for pixels having luminosity values in a range larger than or equal to the first statistic, and converts luminosity values in a range smaller than the first statistic to a minimum value of the predetermined range,
wherein the second adjustment process specifies a second statistic indicating a luminosity value by using the distribution of the luminosity values, enhances contrast for pixels having luminosity values in a range smaller than or equal to the second statistic, and converts luminosity values in a range larger than the second statistic to a maximum value of the predetermined range,
wherein the third adjustment process specifies a specific range of the luminosity values by using the distribution of the luminosity values, the specific range being between an upper limit and a lower limit, the third adjustment process enhances contrast for pixels having luminosity values in the specific range, converts each luminosity value at the lower limit to the minimum value of the predetermined range, and converts each luminosity value at the upper limit to the maximum value of the predetermined range.

10. The non-transitory computer readable storage medium according to claim 9, wherein each of the first statistic and the second statistic is a luminance value having a maximum frequency among luminance values larger than the minimum value of the predetermined range and lower than the maximum value of the predetermined range.

11. The non-transitory computer readable storage medium according to claim 7, wherein each of the first generation process and the second generation process includes a noise reduction process for reducing noise in image data inputted to the noise reduction process, the noise reduction process being executed after the luminance adjustment process.

12. The non-transitory computer readable storage medium according to claim 11, wherein the noise reduction process includes a thresholding process for thresholding pixel values included in image data inputted to the thresholding process.

13. A method for controlling an image generating apparatus, the method comprising:
acquiring target output image data that is converted from target input image data by a pre-trained model, the target input image data representing a captured image of a target product, the target output image data representing an image of a target product free from defects, the pre-trained model being configured to perform data compression and data decompression on image data inputted to the pre-trained model, wherein the pre-trained model is trained so that when image data representing an input image of the target product is inputted to the pre-trained model, the pre-trained model outputs image data representing an image of the target product free from defects irrespective of whether the input image includes a defect or not;
generating first data by performing a first generation process on the target input image data, the first generation process including a luminosity adjustment process, the luminosity adjustment process adjusting luminosity in image data inputted to the luminosity adjustment process;
generating second data by performing a second generation process on the target output image data converted from the target input image data by the pre-trained model in the acquiring, the second generation process including the luminosity adjustment process; and
generating inspection image data by using a difference between the first data and the second data, the inspection image data being used for inspecting an external appearance of the target product.

14. The method according to claim 13, wherein the image data subject to the luminosity adjustment process has pixels and a luminosity value for each pixel, each luminosity value being capable of taking any value within a predetermined range, the luminosity adjustment process specifying a partial range of the predetermined range by using distribution of luminosity values in the image data, and enhancing contrast for pixels having luminosity values in the partial range.

15. The method according to claim 14, wherein the luminosity adjustment process including at least one of a first adjustment process, a second adjustment process, and a third adjustment process,
wherein the first adjustment process specifies a first statistic indicating a luminosity value by using the distribution of the luminosity values, enhances contrast for pixels having luminosity values in a range larger than or equal to the first statistic, and converts luminosity values in a range smaller than the first statistic to a minimum value of the predetermined range,
wherein the second adjustment process specifies a second statistic indicating a luminosity value by using the distribution of the luminosity values, enhances contrast for pixels having luminosity values in a range smaller than or equal to the second statistic, and converts luminosity values in a range larger than the second statistic to a maximum value of the predetermined range,
wherein the third adjustment process specifies a specific range of the luminosity values by using the distribution of the luminosity values, the specific range being between an upper limit and a lower limit, the third adjustment process enhances contrast for pixels having luminosity values in the specific range, converts each luminosity value at the lower limit to the minimum value of the predetermined range, and converts each luminosity value at the upper limit to the maximum value of the predetermined range.

16. The method according to claim 15, wherein each of the first statistic and the second statistic is a luminance value having a maximum frequency among luminance values larger than the minimum value of the predetermined range and lower than the maximum value of the predetermined range.

17. The method according to claim 13, wherein each of the first generation process and the second generation process includes a noise reduction process for reducing noise in image data inputted to the noise reduction process, the noise reduction process being executed after the luminance adjustment process.

18. The method according to claim 17, wherein the noise reduction process includes a thresholding process for thresholding pixel values included in image data inputted to the thresholding process.

\* \* \* \* \*